US011982958B2

(12) United States Patent
Koyama et al.

(10) Patent No.: US 11,982,958 B2
(45) Date of Patent: May 14, 2024

(54) IMAGE FORMING APPARATUS AND IMAGE FORMING METHOD

(71) Applicant: BROTHER KOGYO KABUSHIKI KAISHA, Nagoya (JP)

(72) Inventors: Tatsuya Koyama, Toyoake (JP); Kotaro Fujishiro, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/814,882

(22) Filed: Jul. 26, 2022

(65) Prior Publication Data

US 2023/0032807 A1 Feb. 2, 2023

(30) Foreign Application Priority Data

Jul. 30, 2021 (JP) ................................ 2021-126006

(51) Int. Cl.
*G03G 15/20* (2006.01)

(52) U.S. Cl.
CPC ..... *G03G 15/2039* (2013.01); *G03G 15/2017* (2013.01)

(58) Field of Classification Search
CPC ...................... G03G 15/2039; G03G 15/2017
See application file for complete search history.

(56) References Cited

U.S. PATENT DOCUMENTS

2003/0219274 A1 11/2003 Hirose et al.
2004/0197108 A1* 10/2004 Yamagata .......... H04N 1/32609 399/92
2018/0107142 A1* 4/2018 Samei .................. G03G 15/206
2019/0187593 A1 6/2019 Ishizuka et al.

FOREIGN PATENT DOCUMENTS

JP 2003-345224 A 12/2003
JP 2004-325873 A 11/2004
JP 2019-109397 A 7/2019

* cited by examiner

*Primary Examiner* — Clayton E. LaBalle
*Assistant Examiner* — Michael A Harrison
(74) *Attorney, Agent, or Firm* — Merchant & Gould P.C.

(57) ABSTRACT

There is provided image forming apparatus including: casing; temperature sensor configured to detect temperature in the casing; image forming unit configured to form toner image on sheet; fuser which has heating member configured to heat the sheet, and which is configured to fix the toner image to the sheet; a fan; and a controller. The controller is configured to execute: changing of driving speed of the fan; and waiting control including: stopping supply, to the image forming unit, of next sheet, before the changing of the driving speed; completing the fixing of the toner image to the sheet, before the changing of the driving speed; and restarting supply of the next sheet to the image forming unit after the changing of the driving speed and after waiting time has elapsed since the completion of the fixing of the toner image to the sheet.

15 Claims, 12 Drawing Sheets

IMAGE FORMING APPARATUS AND IMAGE FORMING METHOD

REFERENCE TO RELATED APPLICATIONS

This application claims priority from Japanese Patent Application No. 2021-126006 filed on Jul. 30, 2021. The entire content of the priority application is incorporated herein by reference.

BACKGROUND ART

Conventionally, an image forming apparatus is known, including a fixing unit which fixes a toner image to a sheet by means of heat, and a fan which cools the fixing unit by discharging the air in the image forming apparatus to the outside and/or introducing the outside air into the image forming apparatus. It is known that the control is performed as follows. That is, when the image forming action is not performed, the fan is rotated at a low speed as compared with when the image forming action is performed. When the image forming action is started, the temperature of the fixing unit is detected. The lower the detected temperature is, the later the timing is to switch the rotation from the low speed to the high speed.

DESCRIPTION

FIG. 6 depicts a case in which the driving speed of a fan is changed from the stop to the low speed during the unit time, and then the driving speed of the fan is changed from the low speed to the high speed during the unit time.

FIG. 7 depicts a case in which the driving speed of the fan is changed from the stop to the high speed during the unit time.

FIG. 11 depicts a case in which the fan setting speed and the fan driving speed are changed from the stop to the low speed during the unit time, and then the fan setting speed and the fan driving speed are changed from the low speed to the high speed during the unit time.

FIG. 12 depicts a case in which the fan setting speed and the fan driving speed are changed from the stop to the high speed during the unit time.

In the case of the conventional technique, the driving speed of the fan is switched in some cases when the image forming action is started and the toner image is fixed to the sheet. If the driving speed of the fan is changed when the toner image is fixed, then the temperature of the fixing unit is changed, and thus, there is some possibility of affecting the fixing quality, for example, on account of the decrease in the fixing strength.

In view of the above, an object of the present disclosure is to provide an image forming apparatus and an image forming method which make it possible to reduce the influence on the fixing quality exerted by the change of the driving speed of a fan.

According to the present disclosure, it is possible to reduce the influence on the fixing quality exerted by the change of the driving speed of the fan.

FIRST EMBODIMENT

Next, a first embodiment of the present disclosure will be explained in detail with reference to the drawings.

Figure 1:
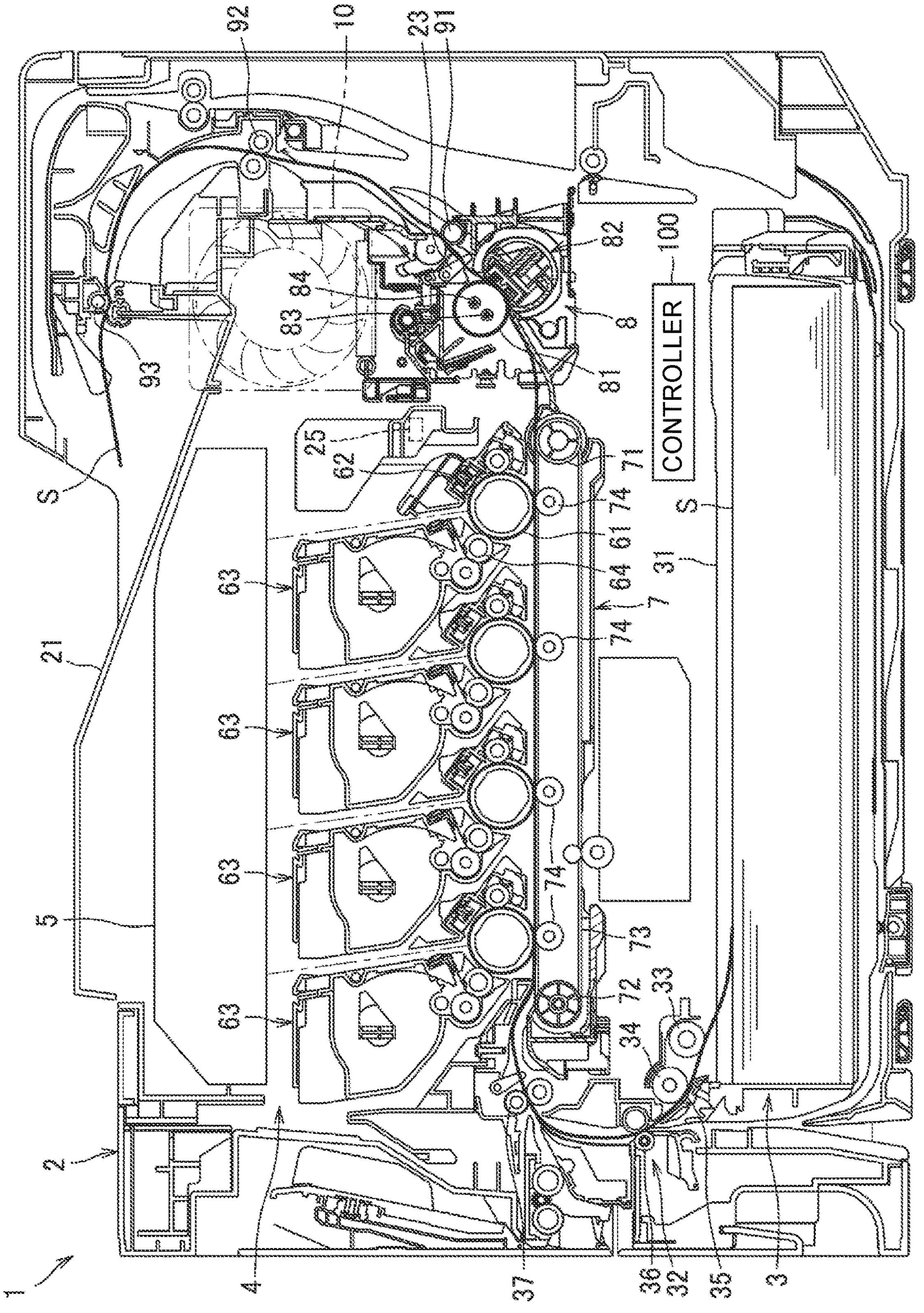
FIG. 1 depicts configuration of an image forming apparatus.

As depicted in FIG. 1, an image forming apparatus 1 is an apparatus which forms an image on a sheet S while conveying the sheet S. The image forming apparatus 1 is a color printer which is capable of forming a color image. The image forming apparatus 1 includes, in a casing 2, a sheet supply unit 3, an image forming unit (image forming unit) 4, a fan 10, a post-fixing sensor 23, an internal temperature sensor 25 which serves as the temperature sensor, and a controller 100. The casing 2 has a discharge tray 21 on an upper surface.

The sheet supply unit 3 has the function to supply the sheet S to the image forming unit 4. The sheet supply unit 3 is provided with a supply tray 31 which is capable of accommodating a plurality of sheets S, and a sheet supply mechanism 32. The sheet supply mechanism 32 has a pickup roller 33, a separation roller 34, a separation pad 35, a conveying roller 36, and a registration roller 37.

The sheet supply unit 3 feeds the sheet S accommodated in the supply tray 31 by means of the pickup roller 33. The sheet S is separated one by one by means of the separation roller 34 and the separation pad 35. The sheet S is conveyed toward the registration roller 37 by means of the conveying roller 36. After that, the sheet supply unit 3 corrects the oblique feeding of the sheet S by aligning the position of the forward end of the sheet S by means of the registration roller 37. The sheet S is supplied to the image forming unit 4.

The image forming unit 4 has the function to form the image on the sheet S. The image forming unit 4 has an exposure unit 5, photosensitive drums 61, electrifiers (chargers) 62, developing cartridges 63, a transfer unit 7, and a fixing unit (fuser) 8. The image forming unit 4 is provided with the four photosensitive drums 61, the four electrifiers 62, and the four developing cartridges 63.

The exposure unit 5 is provided with, for example, a plurality of undepicted light sources, polygon mirrors, lenses, and reflecting mirrors. The exposure unit 5 allows a light beam based on image data (see an alternate long and short dash line) to outgo so that the surface of the photosensitive drum 61 is exposed therewith. Accordingly, an electrostatic latent image is formed on the surface of the photosensitive drum 61.

The photosensitive drum 61 is a member having a photosensitive layer formed on the outer circumference of a cylindrical main drum body having the conductivity. The four photosensitive drums 61 are arranged while being aligned in the conveying direction of the sheet S. The electrifier 62 has the function to electrify the surface of the photosensitive drum 61. The electrifier 62 has, for example, an electrifying wire and a grid electrode. Each of the developing cartridges 63 has a developing roller 64 which is capable of carrying the toner. The toner of yellow, magenta, cyan, or black is accommodated in the developing cartridge 63.

The transfer unit 7 is provided with a driving roller 71, a driven roller 72, a conveying belt 73, and four transfer rollers 74. The conveying belt 73 is an endless belt which is provided to stretch between the driving roller 71 and the driven roller 72. The transfer roller 74 is arranged at the inside of the conveying belt 73 so that the conveying belt 73 is interposed between the transfer roller 74 and the corresponding photosensitive drum 61.

The fixing unit 8 has the function to fix the toner image to the sheet S. The fixing unit 8 has a heating member 81, a pressurizing unit 82, a first heater 83, and a second heater 84. The heating member 81 is a cylindrical heating roller which is heated by the first heater 83 and the second heater 84, and the heating member 81 heats the sheets S. The pressurizing unit 82 is arranged to interpose the sheet S between the pressurizing unit 82 and the heating member 81. The pressurizing unit 82 has the function to apply the pressure to the sheet S between the pressurizing unit 82 and the heating member 81. The pressurizing unit 82 includes, for example, a pressurizing belt which has an endless shape, a pressurizing pad which is arranged to interpose the pressurizing belt between the pressurizing pad and the heating member 81, and a belt guide which rotatably guides the pressurizing belt, these components being depicted while omitting reference numerals thereof. The first heater 83 and the second heater 84 are the heaters which generate the heat to heat the heating member 81 when the electric power is applied. The first heater 83 and the second heater 84 are arranged at the inside of the heating member 81.

The image forming unit 4 electrifies the surface of the photosensitive drum 61 by means of the electrifier 62, and then the surface of the photosensitive drum 61 is exposed by the exposure unit 5. Accordingly, the electrostatic latent image based on the image data is formed on the surface of the photosensitive drum 61. Subsequently, the image forming unit 4 supplies the toner from the developing roller 64 to the electrostatic latent image formed on the photosensitive drum 61. Accordingly, the toner image is formed on the photosensitive drum 61.

Subsequently, the sheet S, which is supplied from the sheet supply unit 3, is conveyed by the conveying belt 73, while the image forming unit 4 allows the sheet S to pass between the photosensitive drum 61 and the transfer roller 74. Thus, the toner image formed on the photosensitive drum 61 is transferred to the sheet S. Accordingly, the toner image is formed on the sheet S.

After that, the sheet S, on which the toner image has been formed, is conveyed between the heating member 81 and the pressurizing unit 82, and thus the image forming unit 4 fixes the toner image to the sheet S. Accordingly, the image is formed on the sheet S. The sheet S, on which the image has been formed, is conveyed by conveying rollers 91, 92, and the sheet S is discharged to the discharge tray 21 by a discharge roller 93.

The post-fixing sensor 23 has the function to detect the sheet S conveyed from the fixing unit 8 toward the discharge tray 21. The post-fixing sensor 23 is arranged downstream from the heating member 81 and the pressurizing unit 82 in the conveying direction of the sheet S. In particular, the post-fixing sensor 23 is arranged between the heating member 81 and the pressurizing unit 82, and the conveying roller 91 in the conveying direction of the sheet S.

As for the post-fixing sensor 23, for example, it is possible to use a sensor including a lever which is rotatable in accordance with the contact of the sheet S and an optical sensor which detects the position of the lever. The post-fixing sensor 23 outputs a detection signal to the controller 100 when the sheet S is detected, or the post-fixing sensor 23 outputs a non-detection signal to the controller 100 when the sheet S is not detected. Note that either one of the detection signal and the non-detection signal can have a higher voltage than that of the other.

The internal temperature sensor (temperature sensor housed in the casing) 25 is a sensor which is provided to detect the temperature in the casing 2 of the image forming apparatus 1. In this embodiment, the internal temperature sensor 25 is arranged between the fixing unit 8 and the developing cartridge 63 which is arranged most downstream in the conveying direction of the sheet S. For example, a thermistor or the like can be used as the internal temperature sensor 25.

The fan 10 is a fan which is provided to cool, for example, the fixing unit 8. The fan 10 is provided at an exhaust port of the casing 2. When the fan 10 is driven, the fan 10 discharges the air in the casing 2 to the outside of the casing 2. The casing 2 has a pair of undepicted left and right side frames. The fan 10 is provided on the right side frame. The fan 10 is arranged upwardly from the fixing unit 8 as viewed in left-right direction. Note that an undepicted duct, which extends in the left-right direction, is provided over or above the fixing unit 8. The fan 10 is arranged on the right side of the duct.

As for the fan 10, it is possible to change the driving speed. In particular, the driving speed of the fan 10 can be changed to the first speed, the second speed which is faster than the first speed, and the third speed which is faster than the second speed. In this embodiment, the first speed is zero. That is, if the driving speed is the first speed, the fan 10 stops. In the following description, the first speed is also referred to as “stop”, the second speed is also referred to as “low speed”, and the third speed is also referred to as “high speed”.

Figure 2A:
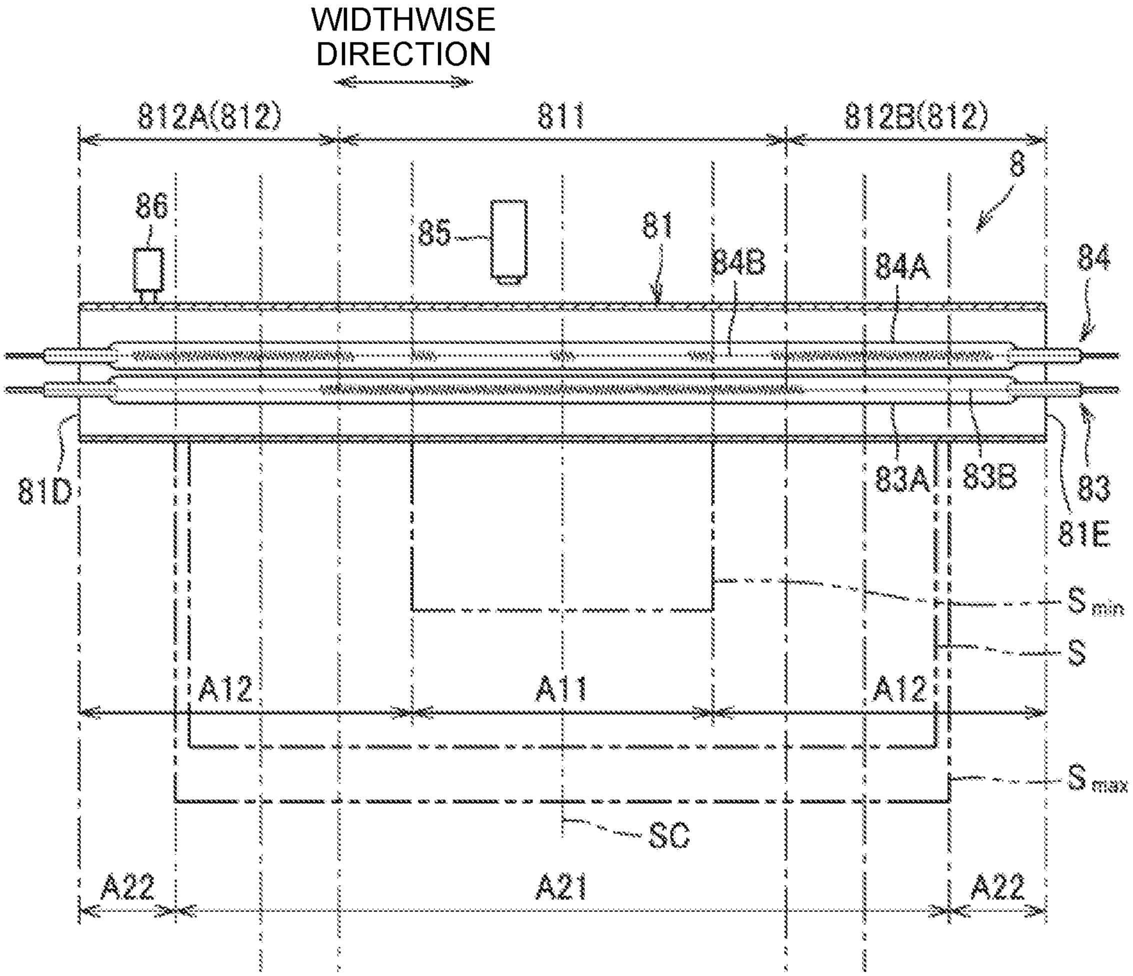
FIG. 2A is an explanatory drawing depicting configuration around a heating member of a fixing unit.

As depicted in FIG. 2A, the fixing unit 8 further comprises a first temperature sensor 85 and a second temperature sensor 86, in addition to the heating member 81, the first heater 83, and the second heater 84. The first temperature sensor 85 and the second temperature sensor 86 are sensors which are provided to detect the temperature of the heating member 81.

The first heater 83 is a halogen heater which has a glass tube 83A and a filament 83B provided at the inside of the glass tube 83A. The filament 83B has a central portion in the widthwise direction of the sheet S at which the heat generating portions are concentrated as compared with the respective end portions in the widthwise direction of the sheet S. Accordingly, the first heater 83 strongly heats the central area 811 of the heating member 81 as compared with the end portion areas 812. As depicted by a broken line in FIG. 2B, the output of the first heater 83 has such a distribution that the output is the highest at the central portion in the widthwise direction, and the output is gradually lowered at positions directed to the both ends in the widthwise direction.

In this case, the widthwise direction of the sheet S is the direction which is orthogonal to the conveying direction of the sheet S in the image forming unit 4. In the following description, the widthwise direction of the sheet S is simply referred to as “widthwise direction” as well. Further, the central area 811 of the heating member 81 is the area which includes the central portion of the heating member 81 in the widthwise direction. Further, the end portion area 812 of the heating member 81 is the area of the heating member 81 which is positioned on the outer side in the widthwise direction as compared with the central area 811. The heating member 81 has, as the end portion areas 812, a first end portion area 812A which is the area disposed between the central area 811 and one end edge 81D of the heating member 81, and a second end portion area 812B which is the area disposed between the central area 811 and the other end edge 81E of the heating member 81.

Figure 2B:
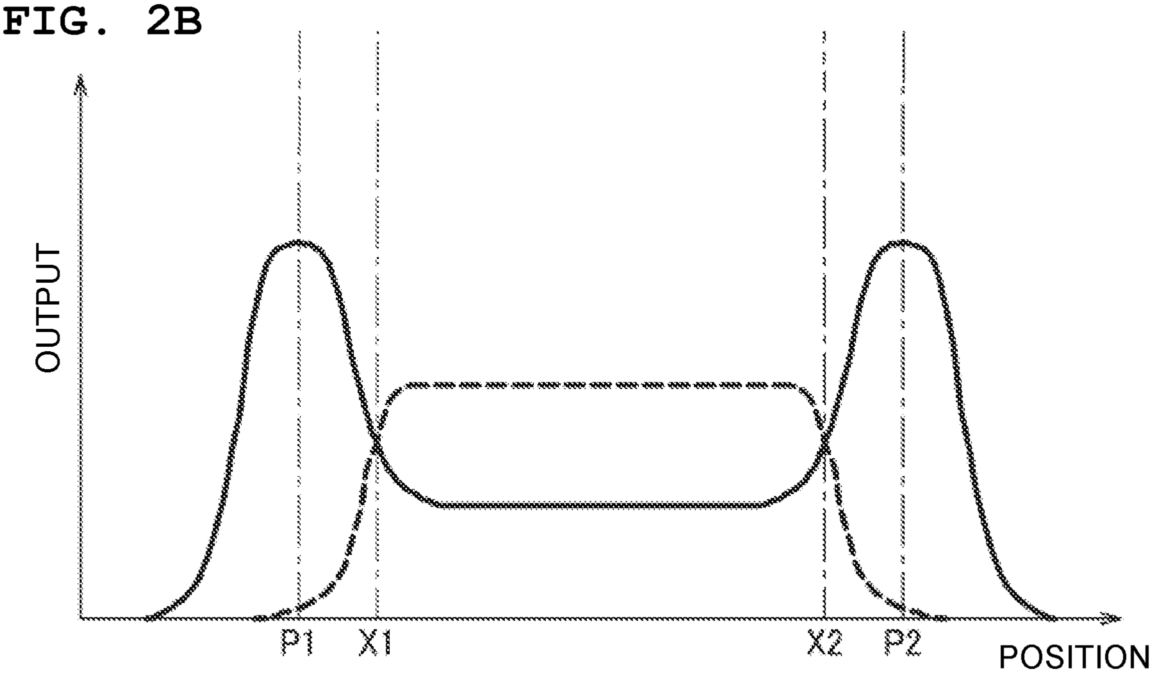
FIG. 2B is a graph depicting outputs of respective heaters.

In this embodiment, the boundaries between the central area 811 and the end portion areas 812 (812A, 812B) are located at positions X1, X2 at which the magnitude correlation of the maximum output of the second heater 84 indicated by the solid line with respect to the maximum output of the first heater 83 indicated by the broken line in FIG. 2B is inverted. In this case, the maximum output of the heater refers to the output which is obtained when the electric power is supplied to the heater at the maximum electric power application duty ratio (100%).

The second heater 84 is a halogen heater which has a glass tube 84A and a filament 84B provided at the inside of the glass tube 84A. The filament 84B has respective end portions in the widthwise direction at which the heat generating portions are concentrated as compared with the central portion in the widthwise direction. Accordingly, the second heater 84 strongly heats the end portion areas 812 of the heating member 81 as compared with the central area 811. As depicted by the solid line in FIG. 2B, the output of the second heater 84 has such a distribution that the both end portions in the widthwise direction are higher than the central portion.

In the fixing unit 8, the setting is made such that the range (peak position), in which the output of the first heater 83 is maximized, is not overlapped in the widthwise direction with the ranges (peak positions P1, P2) at which the output of the second heater 84 is maximized.

The peak position of the output in the widthwise direction of the first heater 83 is positioned in the maximum contact area A21 in the widthwise direction. In particular, the peak position of the output in the widthwise direction of the first heater 83 is positioned in the minimum contact area A11 in the widthwise direction. The peak positions P1, P2 of the output in the widthwise direction of the second heater 84 are positioned in the maximum contact area A21 in the widthwise direction.

In this case, the heating member 81 has the minimum contact area A11, the minimum non-contact area A12, the maximum contact area A21, and the maximum non-contact area A22.

The minimum contact area A11 is an area which makes contact with the sheet Smin when the sheet Smin is conveyed. The size in the widthwise direction of the sheet Smin is the minimum size capable of being conveyed in the image forming unit 4. The minimum contact area A11 includes the central portion of the central area 811 in the widthwise direction. Further, the minimum non-contact area A12 is an area which makes no contact with the sheet Smin when the sheet Smin is conveyed. The size in the widthwise direction of the sheet Smin is the minimum size capable of being conveyed in the image forming unit 4.

Further, the maximum contact area A21 is an area which makes contact with the sheet Smax when the sheet Smax is conveyed. The size in the widthwise direction of the sheet Smax is the maximum size capable of being conveyed in the image forming unit 4. The maximum contact area A21 corresponds to the central area 811 and the portions of the end portion areas 812 from which the outer end portions in the widthwise direction are excluded. Further, the maximum non-contact area A22 is an area which makes no contact with the sheet Smax when the sheet Smax is conveyed. The size in the widthwise direction of the sheet Smax is the maximum size capable of being conveyed in the image forming unit 4. The maximum non-contact area A22 is the outer end portion in the widthwise direction of the end portion area 812.

The peak positions P1, P2 of the output in the widthwise direction of the second heater 84 are positioned in the minimum non-contact areas A12. In other words, the peak positions P1, P2 are positioned on the outer sides of the minimum contact area A11. Further, the peak positions P1, P2 of the output in the widthwise direction of the second heater 84 are positioned on the inner sides as compared with the maximum non-contact areas A22. That is, the peak positions P1, P2 of the output of the second heater 84 are positioned between the minimum contact area A11 and the maximum non-contact areas A22 in the widthwise direction.

As for each of the heaters 83, 84, the specification of the light distribution (luminous intensity distribution) is defined. The specification is decided in accordance with a predetermined detecting method. The method for detecting the output (light distribution) of each of the heaters 83, 84 is exemplified, for example, by a method in which an optical sensor for detecting the light of the heater is arranged while being separated from the heater by a predetermined distance, and the light amount thereof is detected. The predetermined distance is the distance from the heater to the inner circumferential surface of the heating member 81.

The first temperature sensor 85 detects the temperature of the central area 811. In particular, the first temperature sensor 85 detects the temperature of the minimum contact area A11 of the central area 811. The detected temperature, which is detected by the first temperature sensor 85, is outputted to the controller 100.

The first temperature sensor 85 is positioned at the position which is deviated toward the first end portion area 812A with respect to the center (conveyance center SC) in the widthwise direction of the heating member 81. The first temperature sensor 85 detects the temperature of the heating member 81 in a state in which the first temperature sensor 85 is not brought in contact with the heating member 81. In particular, the first temperature sensor 85 is arranged while providing a space from the outer circumferential surface of the heating member 81. For example, a non-contact type thermistor can be used as the first temperature sensor 85. Note that in this embodiment, when the sheet S is conveyed in the fixing unit 8 of the image forming apparatus 1, the sheet S is conveyed while using the center of the heating member 81 in the widthwise direction as the conveyance center SC. Owing to the first temperature sensor 85 which is provided as the non-contact type sensor, it is possible to avoid any damage of the heating member 81, and it is possible to avoid any deterioration of the image quality.

The second temperature sensor 86 detects the temperature of the end portion area 812. Specifically, the second temperature sensor 86 detects the temperature of the first end portion area 812A of the end portion areas 812. More specifically, the second temperature sensor 86 detects the temperature of the maximum non-contact area A22 of the first end portion area 812A. The detected temperature, which is detected by the second temperature sensor 86, is outputted to the controller 100.

The second temperature sensor 86 is positioned at the position different from the peak positions P1, P2 of the output in the widthwise direction of the second heater 84. Specifically, the second temperature sensor 86 is positioned on the outer side in the widthwise direction as compared with the peak position P1 of the output of the second heater 84. In particular, the second temperature sensor 86 is positioned on the outer side in the widthwise direction as compared with the maximum contact area A21. The second temperature sensor 86 detects the temperature of the heating member 81 in a state in which the second temperature sensor 86 is brought in contact with the heating member 81. For example, a contact type thermistor can be used as the second temperature sensor 86.

The controller 100 (see FIG. 1) has, for example, CPU, RAM, ROM, and an input/output circuit. The controller 100 executes the control by performing various calculating processes on the basis of the programs and the data stored, for example, in ROM.

The controller 100 controls the output of the first heater 83 by controlling the electric power application to the first heater 83 so that the detected temperature, which is detected by the first temperature sensor 85, becomes a predetermined target temperature of the central area 811. In particular, the controller 100 performs the feedback process in which the electric power application duty ratio of the AC voltage applied to the first heater 83 is decided on the basis of the difference between the detected temperature of the first temperature sensor 85 and the target temperature, and the electric power application amount per unit time to the first heater 83 is controlled on the basis of the decided electric power application duty ratio.

Further, the controller 100 controls the output of the second heater 84 by controlling the electric power application to the second heater 84 so that the detected temperature, which is detected by the second temperature sensor 86, becomes a predetermined target temperature of the end portion area 812. In particular, the controller 100 performs the feedback process in which the electric power application duty ratio of the AC voltage applied to the second heater 84 is decided on the basis of the difference between the detected temperature of the second temperature sensor 86 and the target temperature, and the electric power application amount per unit time to the second heater 84 is controlled on the basis of the decided electric power application duty ratio.

The electric power application duty ratio is decided so that the electric power application duty ratio approaches 100% more closely if the value, which is obtained by subtracting the detected temperature from the target temperature, is larger. If the detected temperature is larger than the target temperature, the electric power application duty ratio is decided to be 0%.

When the toner image is fixed to the sheet S, the controller 100 changes the driving speed of the fan 10 on the basis of the detection result of the internal temperature sensor 25. Specifically, in this embodiment, when the image is formed on the sheet S after receiving the printing job including the instruction to start the printing and the image data, the controller 100 changes the driving speed of the fan 10 to the speed which is faster than the speed having been provided before the change, if the temperature, which is based on the detection result of the internal temperature sensor 25, is not less than a predetermined temperature.

In particular, when the image is formed on the sheet S, if the temperature, which is based on the detection result of the internal temperature sensor 25, is less than the first predetermined temperature, then the controller 100 provides the first speed for the driving speed of the fan 10. That is, the controller 100 stops the fan 10.

Further, when the image is formed on the sheet S, if the temperature, which is based on the detection result of the internal temperature sensor 25, is not less than the first predetermined temperature and less than the second predetermined temperature which is higher than the first predetermined temperature, then the controller 100 provides the second speed for the driving speed of the fan 10. That is, the controller 100 drives the fan 10 at the low speed.

Further, when the image is formed on the sheet S, if the temperature, which is based on the detection result of the internal temperature sensor 25, is not less than the second predetermined temperature, then the controller 100 provides the third speed for the driving speed of the fan 10. That is, the controller 100 drives the fan 10 at the high speed.

In this case, the temperature, which is based on the detection result of the internal temperature sensor 25, may be either the detected temperature which is detected by the internal temperature sensor 25 or the corrected temperature which is obtained by correcting the detected temperature of the internal temperature sensor 25.

When the driving speed of the fan 10 is changed, the controller 100 outputs a control signal to instruct the voltage to be applied to the fan 10, to an undepicted fan controller which controls the electric power application to the fan 10.

When the toner image is fixed to the sheet S, if the driving speed of the fan 10 is changed, then the controller 100 can execute the waiting control. In the waiting control, the controller 100 operates such that the fixing of the toner image to the sheet S is interrupted, the temperature of the heating member 81 is controlled to be the predetermined target temperature during a predetermined time after the interruption of the fixing of the toner image, and the fixing of the toner image to the sheet S is restarted after the elapse of the predetermined time.

In particular, in the waiting control, the controller 100 operates such that the pickup roller 33 is controlled to interrupt the supply to the fixing unit 8 of the sheet S next to the sheet S subjected to the fixing, the fixing of the toner image to the sheet S subjected to the fixing is completed to discharge the sheet S from the space between the heating member 81 and the pressurizing unit 82, and thus the fixing of the toner image to the sheet S is interrupted.

The controller 100 controls the temperature of the heating member 81 to be the target temperature during the period until a predetermined time elapses from the point in time at which the post-fixing sensor 23 does not detect the sheet S subjected to the fixing, after the interruption of the fixing of the toner image to the sheet S. In particular, the controller 100 controls the electric power application to the first heater 83 so that the detected temperature of the first temperature sensor 85 becomes the target temperature of the central area 811, and the controller 100 controls the electric power application to the second heater 84 so that the detected temperature of the second temperature sensor 86 becomes the target temperature of the end portion area 812.

The controller 100 controls the pickup roller 33 after the elapse of the predetermined time so that the supply of the next sheet S to the fixing unit 8 is restarted, and thus the fixing of the toner image to the sheet S is restarted.

The controller 100 may be configured such that the toner image, which is the same as that for the previous sheet S subjected to the fixing upon the start of the waiting control, is transferred to the next sheet S to perform the fixing if the fixing of the toner image to the sheet S is restarted. In other words, the waiting control may be also executed when the printing job for forming the image on one sheet S is received, without being limited to only the case of the reception of the printing job in which the next sheet S (page subjected to the printing next time) is present, i.e., the printing job in which the image is continuously formed on a plurality of sheets S. Accordingly, it is possible to redo, on the next sheet S, the printing on the previous sheet S.

If the driving speed of the fan 10 is changed when the toner image is fixed to the sheet S, the controller 100 executes the waiting control, if the change amount per unit time of the driving speed of the fan 10 (hereinafter referred to as “speed change amount” as well) is not less than a predetermined amount. In this embodiment, if the driving speed of the fan 10 is changed between the first speed and the third speed during the unit time during the printing for forming the image on the sheet S, then the controller 100 determines that the speed change amount is not less than the predetermined amount, and the controller 100 executes the waiting control.

In particular, the controller 100 executes the waiting control if the driving speed of the fan 10 is changed from the stop to the high speed during the unit time during the printing, and if the driving speed of the fan 10 is changed from the high speed to the stop during the unit time during the printing. The unit time is not specifically limited. However, for example, the unit time is about 5 to 10 seconds. Note that waiting control is executed even if the process undergoes the low speed on the way provided that the driving speed of the fan 10 is changed between the stop and the high speed during the unit time.

Further, if the driving speed of the fan 10 is changed when the toner image is fixed to the sheet S, then the controller 100 continues the fixing of the toner image to the sheet S without executing the waiting control, if the speed change amount is less than the predetermined amount. In this embodiment, in at least one of a case in which the driving speed of the fan 10 is changed between the first speed and the second speed during the unit time during the printing and a case in which the driving speed of the fan 10 is changed between the second speed and the third speed during the unit time during the printing, the controller 100 determines that the speed change amount is less than the predetermined amount, and the controller 100 continues the fixing of the toner image to the sheet S without executing the waiting control.

In particular, the controller 100 continues the fixing of the toner image to the sheet S if the driving speed of the fan 10 is changed from the stop to the low speed during the unit time during the printing (in other words, if the driving speed of the fan 10 is merely changed from the stop to the low speed), and if the driving speed of the fan 10 is changed from the low speed to the stop during the unit time during the printing. Further, the controller 100 continues the fixing of the toner image to the sheet S if the driving speed of the fan 10 is changed from the low speed to the high speed during the unit time during the printing, and if the driving speed of the fan 10 is changed from the high speed to the low speed during the unit time during the printing (in other words, if the driving speed of the fan 10 is merely changed from the high speed to the low speed).

Figure 3:
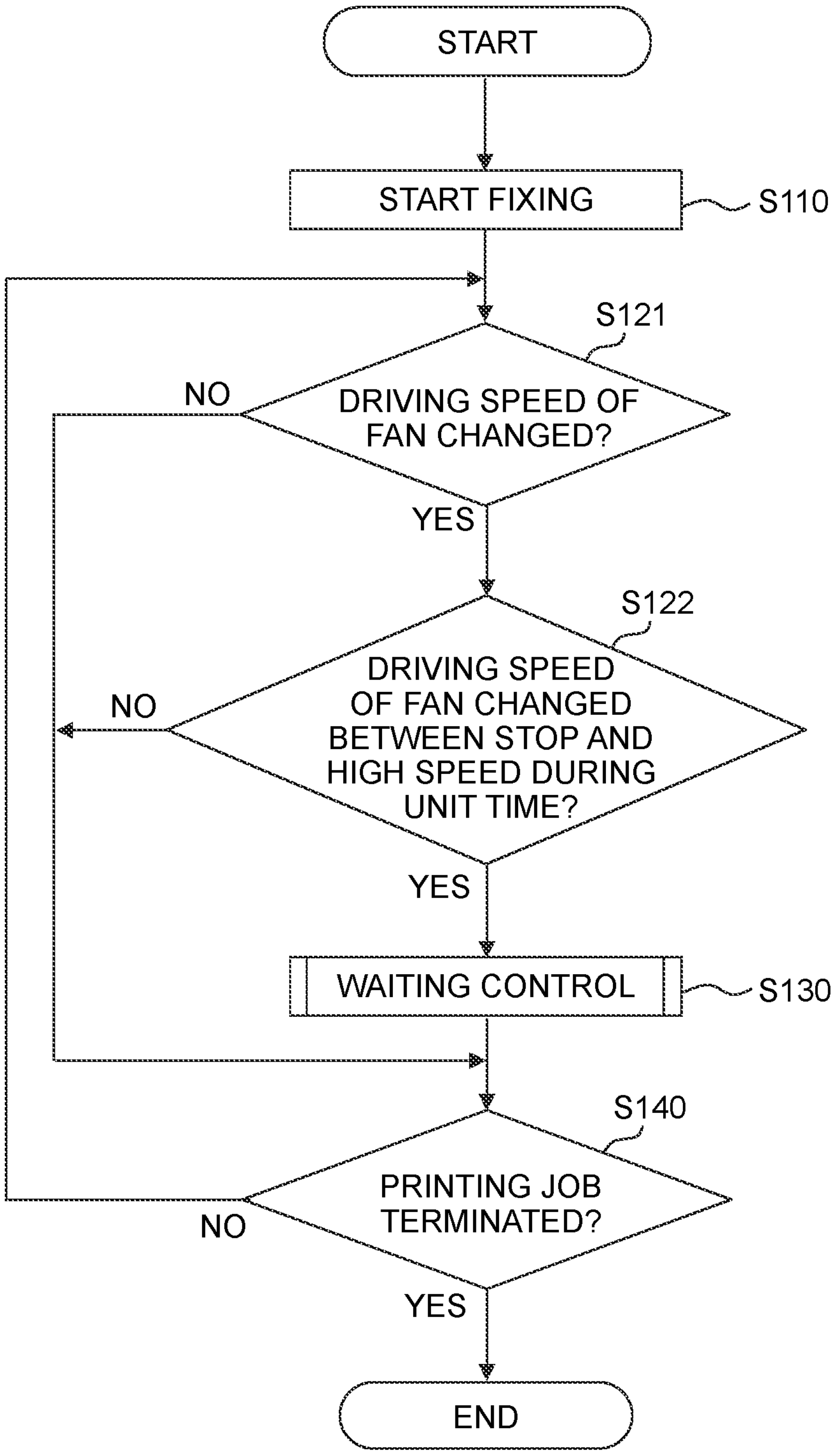
FIG. 3 is a flow chart depicting an operation of a controller.

Next, the operation of the controller 100 will be explained with reference to a flow chart. As depicted in FIG. 3, if the printing job is received, the controller 100 starts the printing operation including the fixing of the toner image to the sheet S (S110).

Figure 4:
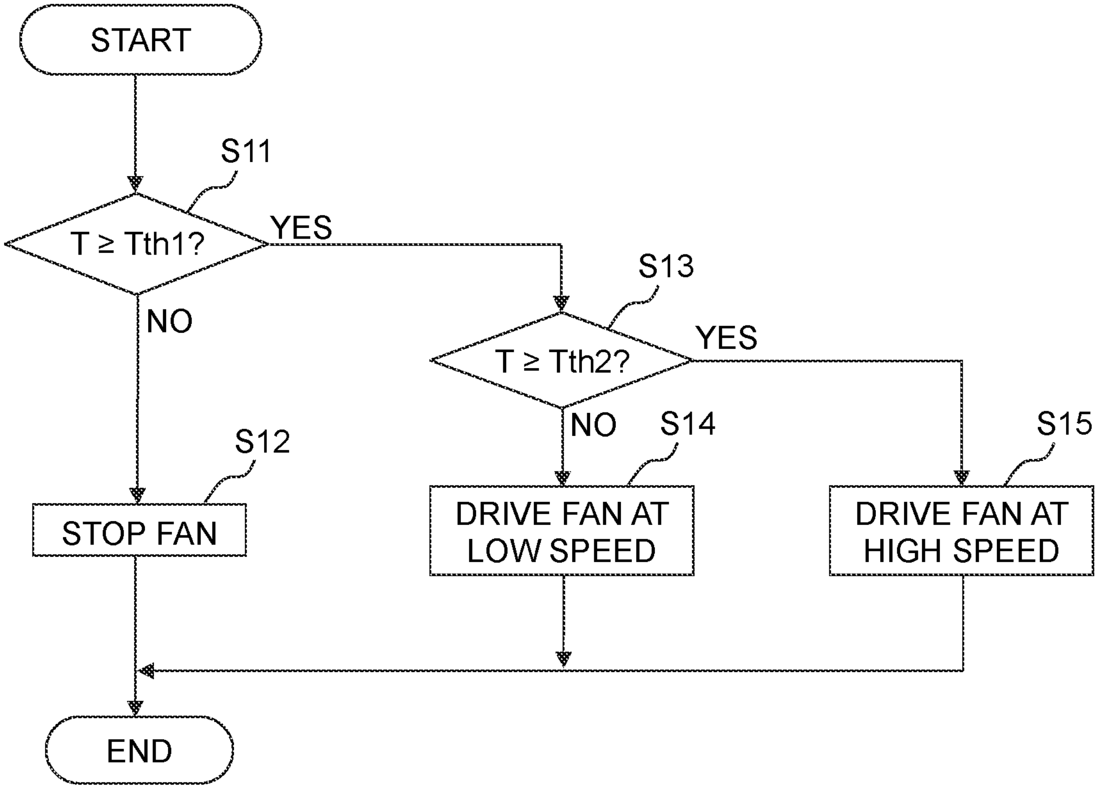
FIG. 4 is a flow chart depicting a process of fan control.

Further, if the printing job is received, the controller 100 repeatedly executes the process of fan control shown in FIG. 4 until the printing job is terminated. In particular, the controller 100 determines whether or not the temperature T, which is based on the detection result of the internal temperature sensor 25, is not less than the first predetermined temperature Tth1 during the printing (S11).

Then, if the temperature T, which is based on the detection result of the internal temperature sensor 25, is less than the first predetermined temperature Tth1 (S11, No), the controller 100 stops the fan 10 (S12). In particular, the controller 100 outputs the control signal to stop the fan 10 to the fan controller.

In Step S11, if the temperature T, which is based on the detection result of the internal temperature sensor 25, is not less than the first predetermined temperature Tth1 (S11, Yes), the controller 100 determines whether or not the temperature T, which is based on the detection result of the internal temperature sensor 25, is not less than the second predetermined temperature Tth2 (S13).

Then, if the temperature T, which is based on the detection result of the internal temperature sensor 25, is less than the second predetermined temperature Tth2 (S13, No), the controller 100 drives the fan 10 at the low speed (S14). In particular, the controller 100 outputs the control signal to drive the fan 10 at the low speed to the fan controller.

In Step S13, if the temperature T, which is based on the detection result of the internal temperature sensor 25, is not less than the second predetermined temperature Tth2 (S13, Yes), the controller 100 drives the fan 10 at the high speed (S15). In particular, the controller 100 outputs the control signal to drive the fan 10 at the high speed to the fan controller.

With reference to FIG. 3 again, after the fixing of the toner image to the sheet S is started, the controller 100 determines whether or not the driving speed of the fan 10 is changed, specifically whether or not the control signal has been outputted to the fan controller (S121). If the driving speed of the fan 10 is changed (S121, Yes), the controller 100 determines whether or not the driving speed of the fan 10 is changed between the stop and the high speed during the unit time (S122).

Figure 5:
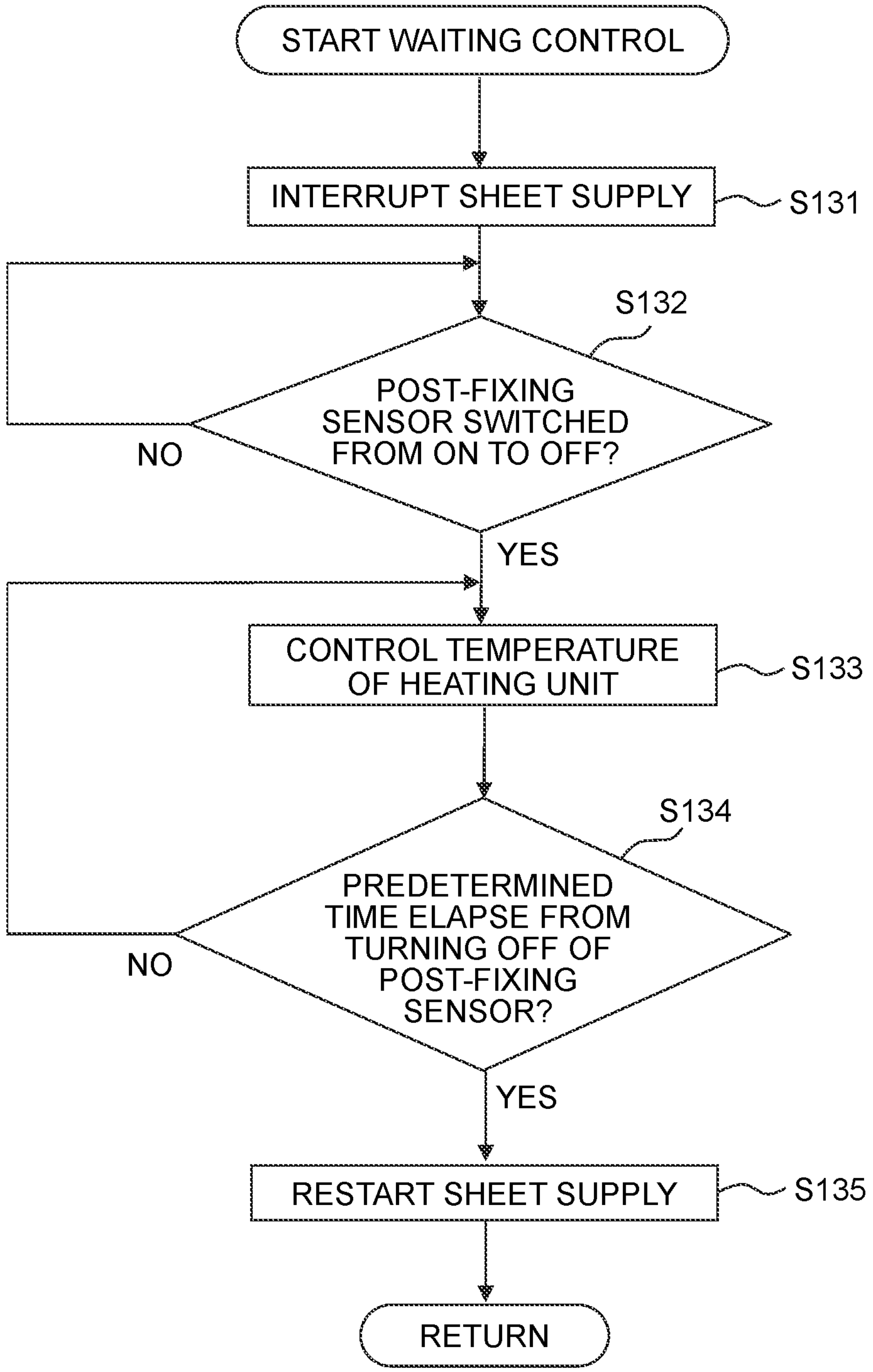
FIG. 5 is a flow chart depicting a process of waiting control.

If the driving speed of the fan 10 is changed between the stop and the high speed during the unit time (S122, Yes), the controller 100 executes the waiting control (S130). In particular, as depicted in FIG. 5, the controller 100 firstly interrupts the fixing of the toner image to the sheet S in the waiting control.

In this embodiment, the controller 100 does not drive the pickup roller 33, and the controller 100 interrupts the supply of the sheet S next to the sheet S subjected to the fixing to the fixing unit 8 (S131). Further, the controller 100 completes the fixing of the toner image to the sheet S subjected to the fixing, and the controller 100 discharges the sheet S from the space between the heating member 81 and the pressurizing unit 82. In particular, the controller 100 judges whether or not the post-fixing sensor 23 is switched from the state in which the sheet S subjected to the fixing is detected to the state in which the sheet S subjected to the fixing is not detected (whether or not the post-fixing sensor 23 is switched from ON to OFF) (S132). If the post-fixing sensor 23 is not turned OFF (S132, No), the controller 100 waits until the post-fixing sensor 23 is turned OFF. If the post-fixing sensor 23 is turned OFF (S132, Yes), the controller 100 proceeds to Step S133.

In Step S133, the controller 100 starts the control so that the temperature of the heating member 81 becomes the predetermined target temperature. In particular, the controller 100 controls the electric power application to the heaters 83, 84 so that the temperature of the heating member 81 becomes the predetermined target temperature.

After starting the temperature control of the heating member 81, the controller 100 determines whether or not a predetermined time elapses after turning OFF the post-fixing sensor 23 (S134). If the predetermined time does not elapse (S134, No), the controller 100 returns to Step 133 to continue the temperature control of the heating member 81.

In Step S134, if the predetermined time elapses (S134, Yes), the controller 100 restarts the fixing of the toner image to the sheet S. In particular, the controller 100 drives the pickup roller 33 to restart the supply of the next sheet S to the fixing unit 8 (S135). After that, the controller 100 proceeds to Step S140 depicted in FIG. 3.

Further, in Step S121 depicted in FIG. 3, if the driving speed of the fan 10 is not changed (S121, No), then the controller 100 continues the fixing of the toner image to the sheet S, and the controller 100 proceeds to Step S140. Further, in Step S122, if the driving speed of the fan 10 is not changed between the stop and the high speed during the unit time (S122, No), i.e., if the driving speed of the fan 10 is changed between the stop and the low speed during the unit time, or if the driving speed of the fan 10 is changed between the low speed and the high speed during the unit time, then the controller 100 continues the fixing of the toner image to the sheet S, and the controller 100 proceeds to Step S140.

In Step S140, the controller 100 determines whether or not the printing job is terminated. If the printing job is not terminated (S140, No), the controller 100 returns to Step S121 to execute the step S121 and the succeeding processes. If the printing is terminated (S140, Yes), the controller 100 terminates the operation depicted in FIG. 3.

Next, an explanation will be made with reference to a timing chart about an exemplary operation of the controller 100.

Figure 6:
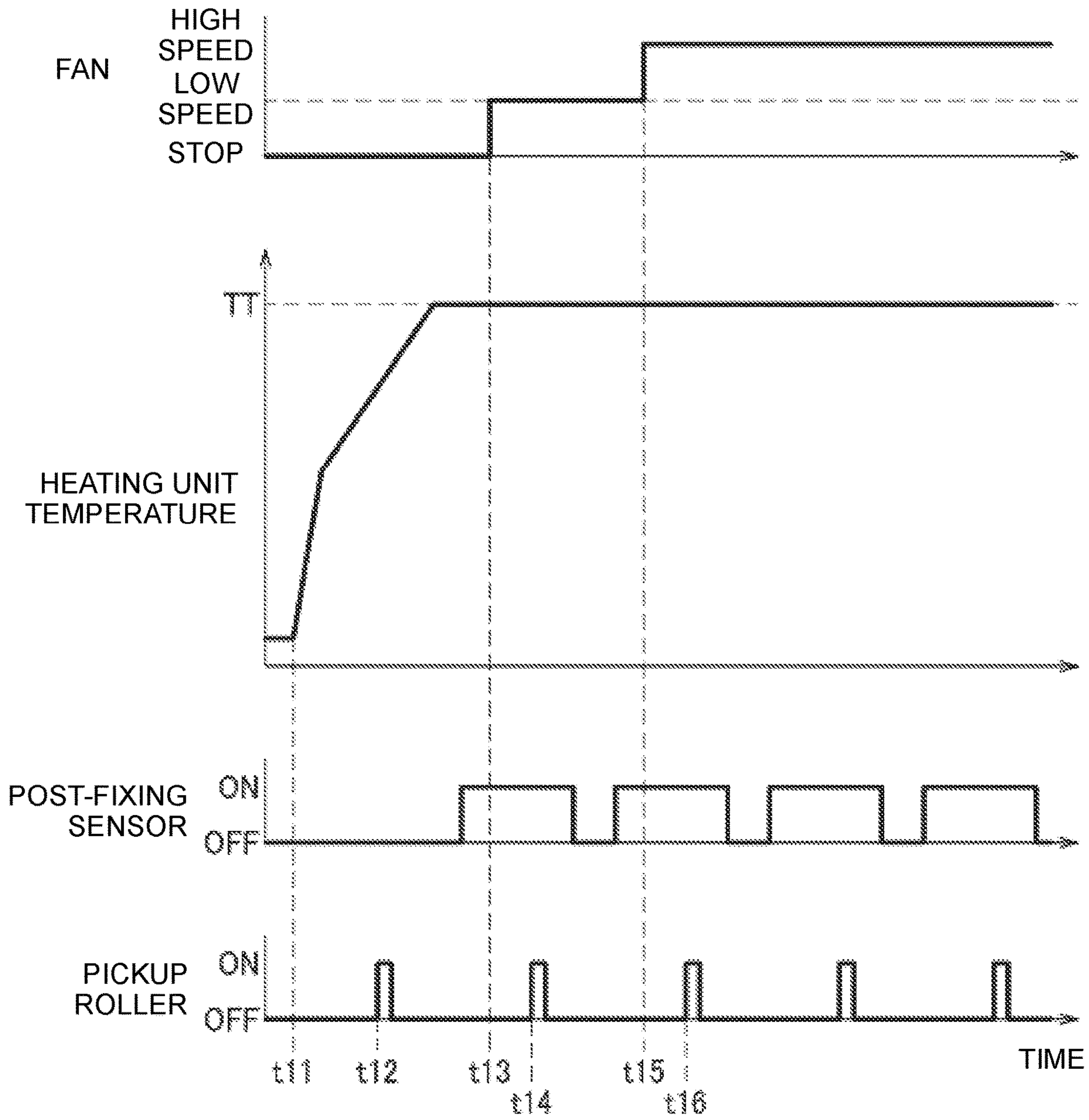
FIG. 6 is a timing chart depicting an exemplary operation of the controller.

As depicted in FIG. 6, when the printing job is received (time t11), the controller 100 performs the control so that the temperature of the heating member 81 becomes the predetermined target temperature TT. Further, the pickup roller 33 is driven (turned ON) at an appropriate timing (time t12) to supply the sheet S from the supply tray 31 toward the image forming unit 4. The controller 100 executes the transfer and the fixing of the toner image to the sheet S.

During the printing, when the driving speed of the fan 10 is switched from the stop to the low speed during the unit time (time t13), and when the driving speed of the fan 10 is switched from the low speed to the high speed during the unit time (time t15), then the influence on the temperature of the heating member 81 is small, and hence the controller 100 continuously executes the fixing of the toner image to the sheet S without causing any interruption. Specifically, the controller 100 turns ON the pickup roller 33 at a predetermined timing (for example, time t14, t16) after the time t12 to supply the sheet S from the supply tray 31 toward the image forming unit 4, and the controller 100 continues the transfer and the fixing of the toner image to the sheet S.

Figure 7:
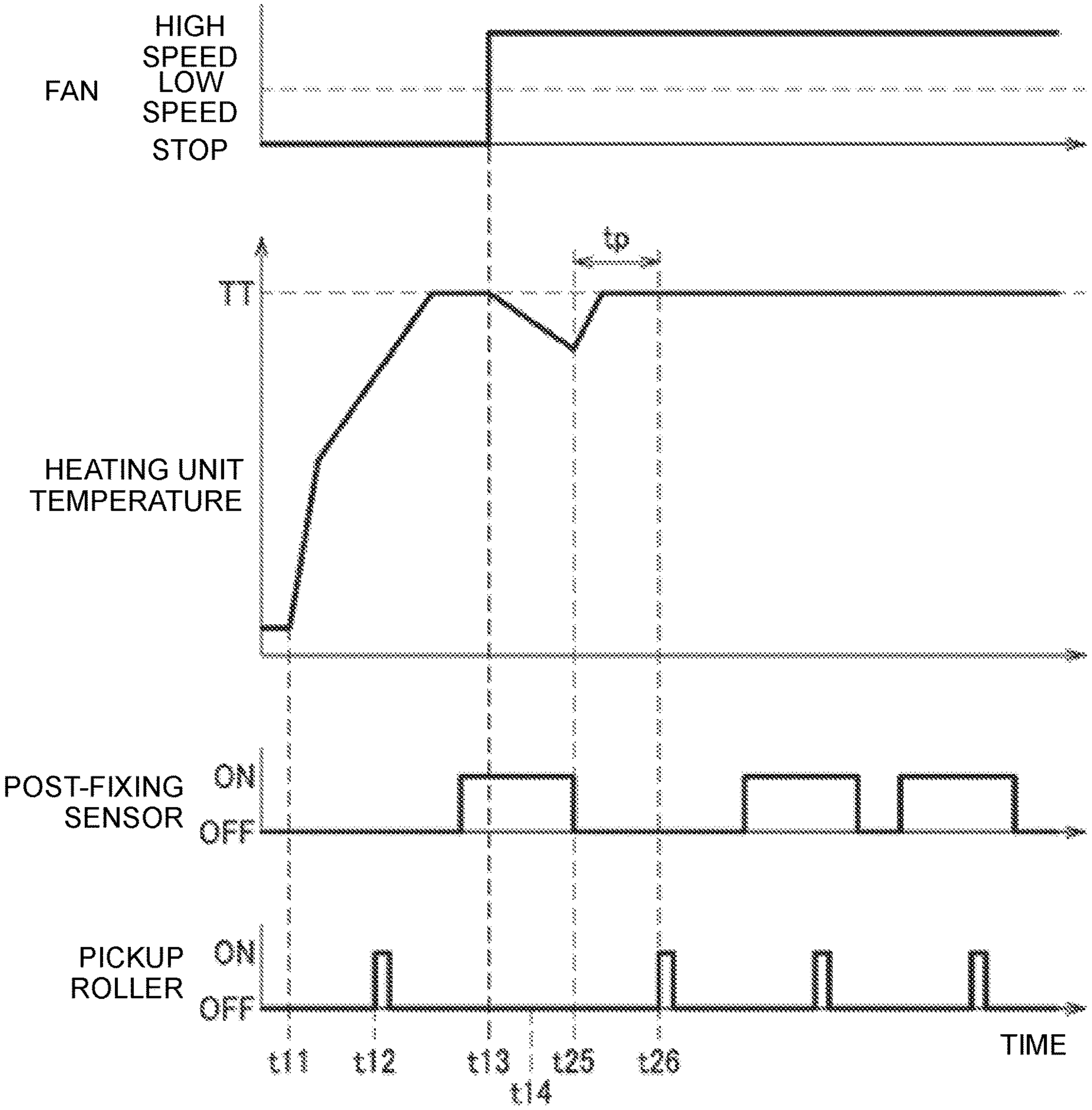
FIG. 7 is a timing chart depicting an exemplary operation of the controller.

On the other hand, as depicted in FIG. 7, during the printing, when the driving speed of the fan 10 is switched from the stop to the high speed during the unit time (time t13), then, for example, the temperature of the heating member 81 is easily lowered, and the influence on the temperature of the heating member 81 is large. Therefore, the controller 100 executes the waiting control, and the controller 100 firstly interrupts the fixing of the toner image to the sheets S. Specifically, the controller 100 does not drive (turns OFF) the pickup roller 33 at the time t14, and the controller 100 interrupts the supply of the sheet S from the supply tray 31 to the image forming unit 4.

Then, the controller 100 controls the temperature of the heating member 81 to be the target temperature TT during the period of a predetermined time tp after the point in time at which the post-fixing sensor 23 is turned OFF from ON at the time t25, after the sheet S subjected to the fixing is discharged from the space between the heating member 81 and the pressurizing unit 82. Then, when the predetermined time tp elapses at the time t26, then the controller 100 turns ON the pickup roller 33 to supply the sheet S from the supply tray 31 toward the image forming unit 4, and the controller 100 restarts the transfer and the fixing of the toner image to the sheet S.

According to the embodiment of the present disclosure as described above, the waiting control is executed if the driving speed of the fan 10 is changed when the toner image is fixed to the sheet S. Accordingly, even when the temperature of the heating member 81 is, for example, lowered on account of the change of the driving speed of the fan 10, the fixing of the toner image to the sheet S can be once interrupted, and the fixing of the toner image to the sheet S can be restarted after heating the heating member 81 so that the temperature of the heating member 81 arrives at the target temperature TT. Accordingly, it is possible to reduce the influence on the fixing quality, including, for example, the deterioration of the fixing strength caused by the change of the driving speed of the fan 10.

Further, the waiting control is executed when the speed change amount is not less than the predetermined amount. Therefore, it is possible to execute the waiting control when the change amount of the driving speed of the fan 10 is large and the influence on the fixing quality easily arises on account of the change of the driving speed of the fan 10. Accordingly, it is possible to effectively reduce the influence on the fixing quality caused by the change of the driving speed of the fan 10.

Further, when the speed change amount is less than the predetermined amount, the fixing of the toner image to the sheet S is continued without executing the waiting control. Therefore, when the change amount of the driving speed of the fan 10 is small, and the influence on the fixing quality is hardly caused by the change of the driving speed of the fan 10, then the fixing of the toner image to the sheet S can be continued without interrupting the fixing. Accordingly, it is possible to suppress any excessively long time required until the received printing job is terminated.

Further, it is determined that the speed change amount is not less than the predetermined amount if the driving speed of the fan 10 is changed between the stop and the high speed during the unit time. Therefore, it is possible to easily determine the case in which the change amount of the driving speed of the fan 10 is large, for example, as compared with a case in which the inclination of the change of the voltage applied to the fan or the like is calculated.

Further, it is determined that the speed change amount is less than the predetermined amount if the driving speed of the fan 10 is changed between the stop and the low speed during the unit time or if the driving speed of the fan 10 is changed between the low speed and the high speed during the unit time. Therefore, it is possible to easily determine the case in which the change amount of the driving speed of the fan 10 is small, for example, as compared with a case in which the inclination of the change of the voltage applied to the fan or the like is calculated.

Further, the driving speed of the fan 10 is changed to the speed which is faster than that provided before the change, if the temperature, which is based on the detection result of the internal temperature sensor 25, is not less than the predetermined temperature. Therefore, it is possible to suppress any excessively high temperature in the casing 2 when the toner image is fixed to the sheet S.

Further, in the waiting control, the fixing of the toner image to the sheets S is interrupted after completing the fixing of the toner image to the sheet S subjected to the fixing. Therefore, it is possible to complete the fixing of the toner image in relation to the sheet S subjected to the fixing.

SECOND EMBODIMENT

A second embodiment of the present disclosure will be explained with reference to FIG. 8 to FIG. 12.

An image forming apparatus 1 of the second embodiment is structurally the same as the image forming apparatus 1 of the first embodiment. As for the image forming apparatus 1 of the second embodiment, the control contents, which are executed by the controller 100, are different from those of the image forming apparatus 1 of the first embodiment. In the following description, an explanation will be made principally about the difference from the first embodiment in relation to the contents of the control executed by the controller 100 of the image forming apparatus 1 of the second embodiment.

Figure 8:
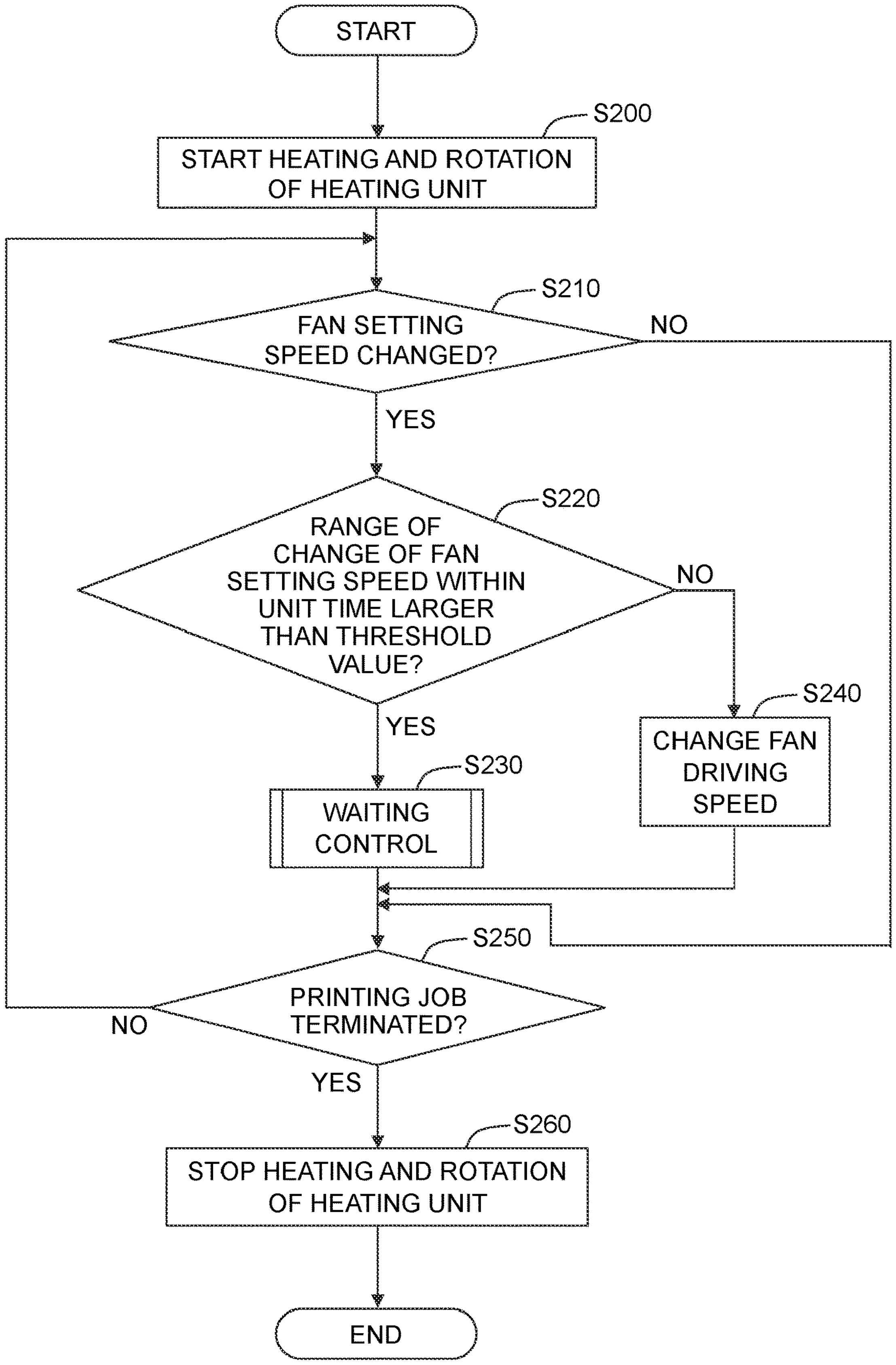
FIG. 8 is a flow chart depicting a process of fixing control.

If the printing job is received, the controller 100 starts the fixing control depicted in a flow chart of FIG. 8.

Figure 9:
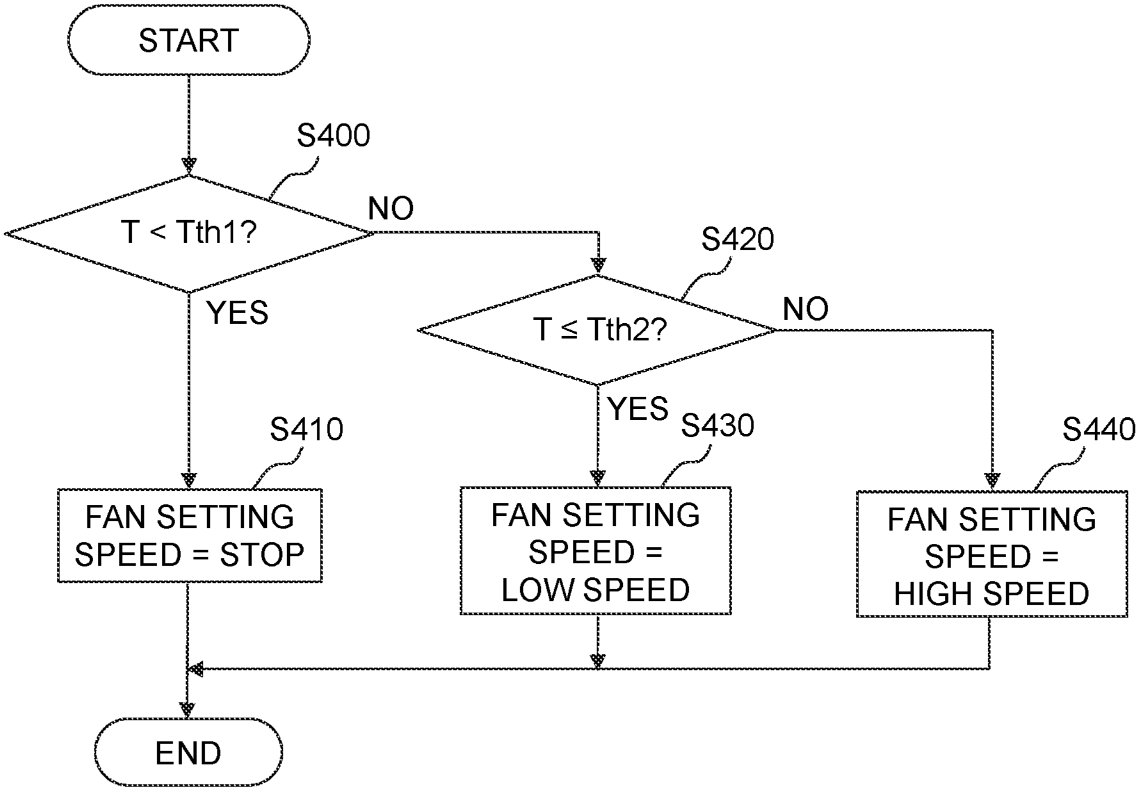
FIG. 9 is a flow chart depicting a process of fan speed setting control.

Further, if the printing job is received, the controller 100 continuously executes the fan speed setting control depicted in a flow chart of FIG. 9 until the printing job is terminated.

In the fan speed setting control, it is firstly determined whether or not the temperature T, which is based on the detection result of the internal temperature sensor 25, is lower than a first predetermined temperature Tth1 (S400). If the temperature T is lower than the first predetermined temperature Tth1 (S400, Yes), the set value of the driving speed of the fan 10 (hereinafter referred to as "fan setting speed") is set to "stop" (S410).

If the temperature T is not less than the first predetermined temperature Tth1 (S400, No), the controller 100 determines whether or not the temperature T is not more than a second predetermined temperature Tth2 (S420). If the temperature T is not more than the second predetermined temperature Tth2 (S420, Yes), the controller 100 sets the fan setting speed to "low speed" (S430). If the temperature T is higher than the second predetermined temperature Tth2 (S420, No), the controller 100 sets the fan setting speed to "high speed" (S440).

Note that in Step S410, Step S430, and Step S440, the controller 100 merely sets the fan setting speed recorded in the memory (contained, for example, in the controller 100) to "stop", "low speed", or "high speed", and the controller 100 does not actually change the speed of the fan 10. That is, at the stages of Step S410, Step S430, and Step S440, the controller 100 does not output the control signal to change the driving speed of the fan 10 to "stop", "low speed", or "high speed" to the fan controller yet.

In the fixing control (FIG. 8), the heating and the rotation of the heating member 81 (heating roller) are firstly started (S200). In this state, the formation of the toner image on the sheet S is executed by the image forming unit 4, and the fixing of the toner image to the sheet S is executed by the fixing unit 8.

Subsequently, in the fan speed setting control (FIG. 9), it is confirmed whether or not the fan setting speed is changed (S210). If the fan setting speed is changed (S210, Yes), it is determined whether or not the range of change of the fan setting speed within the unit time is larger than a threshold value (S220).

Specifically, for example, if the fan setting speed is changed between the stop and the high speed within the unit time, the controller 100 determines that the range of change of the fan setting speed within the unit time is larger than the threshold value. On the other hand, if the fan setting speed is changed between the stop and the low speed within the unit time, or if the fan setting speed is changed between the low speed and the high speed within the unit time, then the controller 100 determines that the range of change of the fan setting speed within the unit time is not more than the threshold value.

If the range of change of the fan setting speed is larger than the threshold value (S220, Yes), the waiting control (S230) is performed. Details of the waiting control will be described later on.

If the range of change of the fan setting speed is not more than the threshold value (S220, No), the controller 100 changes the fan driving speed (i.e., the actual driving speed of the fan 10 which is equivalent to the "driving speed" of the first embodiment) (S240). Specifically, the controller 100 outputs, to the fan controller, the control signal corresponding to the fan setting speed set in the fan speed setting control so that the driving speed of the fan 10 is actually changed to the set fan setting speed.

Figure 10:
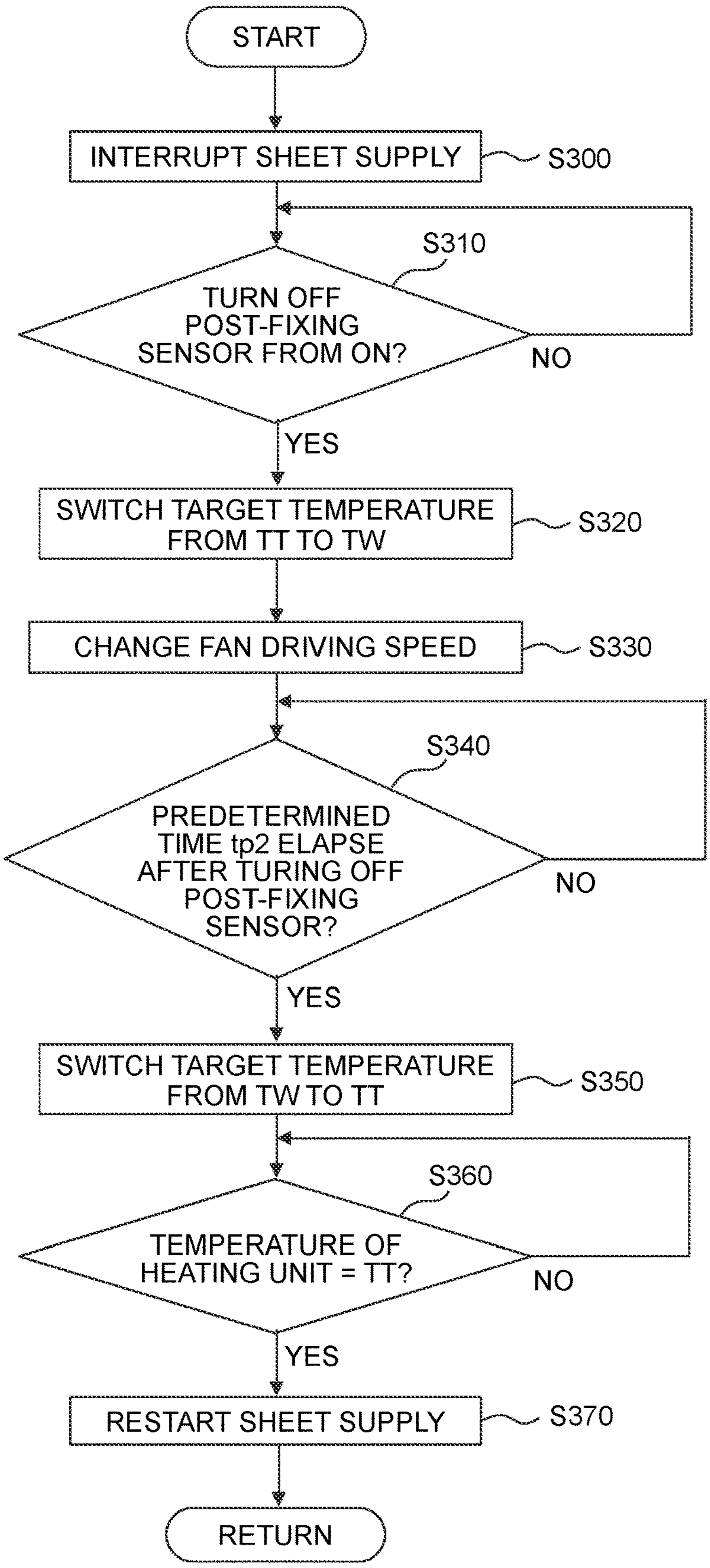
FIG. 10 is a flow chart depicting a process of waiting control.

Specifically, for example, the waiting control (S230) is performed as follows in accordance with a flow chart depicted in FIG. 10.

At first, the controller 100 stops the driving of the pickup roller 33, and the controller 100 stops (interrupts) the supply of the sheet S to the image forming unit 4 and the fixing unit 8 (S300). Then, it is determined whether or not the output of the post-fixing sensor 23 is switched from the signal that indicates the state (ON state) in which the sheet S subjected to the fixing is detected to the signal that indicates the state (OFF state) in which the sheet S is not detected (S310). If it is determined that the output of the post-fixing sensor 23 is not switched to the signal that indicates the OFF state (S310, No), the controller 100 repeats Step S310.

If it is determined that the output of the post-fixing sensor 23 is switched from the signal that indicates the ON state to the signal that indicates the OFF state (S310, Yes), the controller 100 switches the target temperature of the heating member 81 from the target temperature TT to the target temperature TW (an example of the "waiting temperature") which is lower than the target temperature TT.

Subsequently, the controller 100 changes the fan driving speed (S330). Specifically, the controller 100 outputs, to the fan controller, the control signal corresponding to the fan setting speed set in the fan speed setting control in the same manner as in Step S240 so that the driving speed of the fan 10 is actually changed to the set fan setting speed.

After that, the controller 100 determines whether or not the elapsed time, which elapses after switching the output of the post-fixing sensor 23 to the signal that indicates the OFF state, exceeds a predetermined time tp2 (S340). If the elapsed time does not exceed the predetermined time tp2 (S340, No), the determination of Step S340 is repeated.

If the elapsed time exceeds the predetermined time tp2 (S340, Yes), the controller 100 switches the target temperature of the heating member 81 from the target temperature TW to the target temperature TT (S350). Then, it is determined whether or not the temperature of the heating member 81 returns to the target temperature TT (S360). If the temperature of the heating member 81 returns to the target temperature TT (S360, Yes), the pickup roller 33 is driven to start (restart) the supply of the sheet S (S370).

In the fixing control (FIG. 8), the waiting control (S230) or the change of the fan driving speed (S240) is performed, and then it is determined whether or not the printing job is terminated (S250). If it is determined that the printing job is not terminated (S250, No), the controller 100 returns to Step S210 to confirm whether or not the fan setting speed is changed.

If it is determined that the printing job is terminated (S250, Yes), the controller 100 stops the rotation and the heating of the heating member 81 (heating roller) (S260).

Next, an exemplary operation of the controller 100 will be explained with reference to a timing chart.

Figure 11:
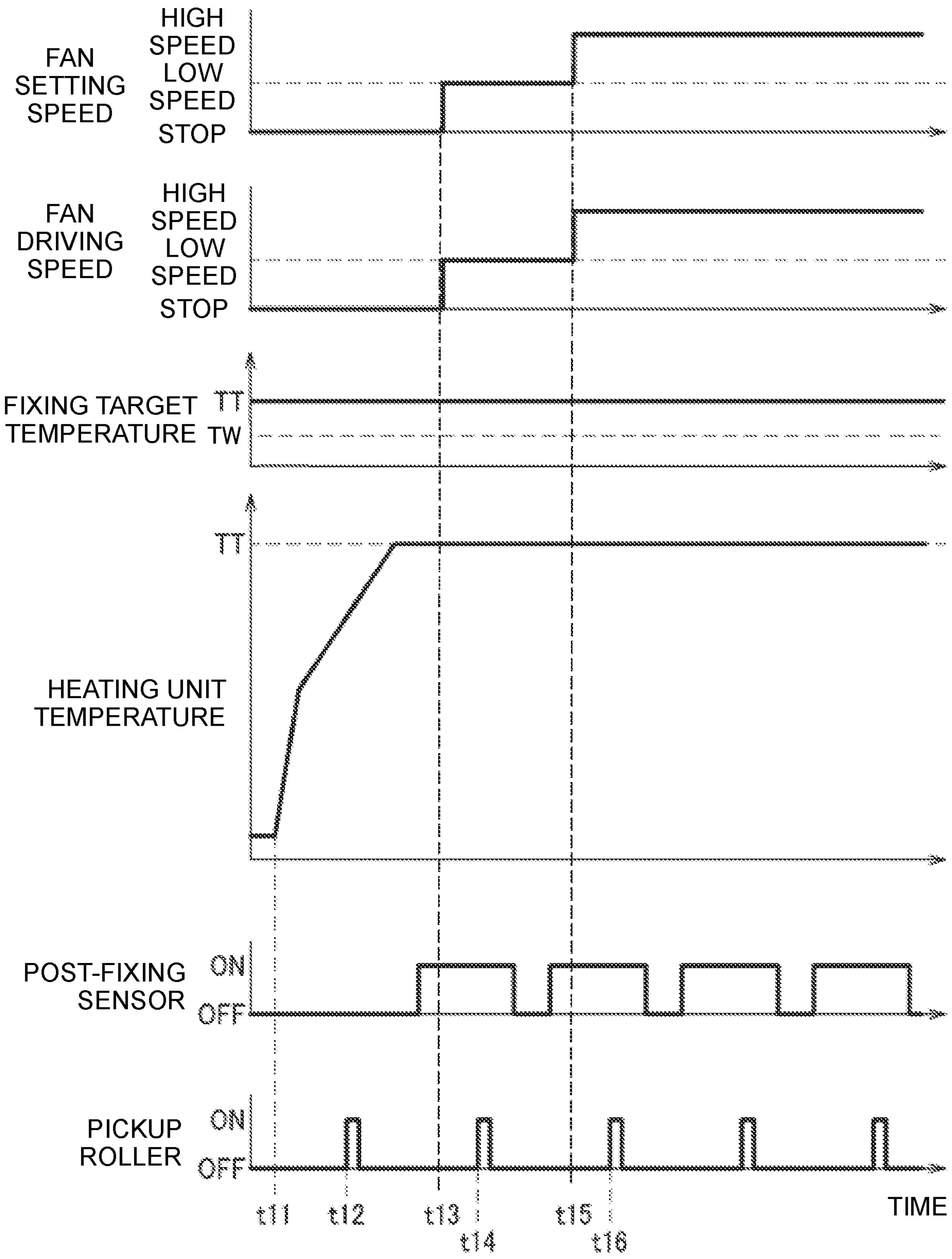
FIG. 11 is a timing chart depicting an exemplary operation of the controller.

As depicted in FIG. 11, if the printing job is received (time t11), the controller 100 controls the temperature of the heating member 81 so that the temperature of the heating member 81 becomes the predetermined target temperature TT. Further, the pickup roller 33 is driven (turned ON) at an appropriate timing (time t12), and the sheet S is supplied from the supply tray 31 to the image forming unit 4 to execute the printing on the sheet S, i.e., the transfer and the fixing of the toner image with respect to the sheet S.

When the fan setting speed (and the fan driving speed) of the fan 10 is switched during the printing from the stop to the low speed during the unit time (time t13), and when the fan setting speed (and the fan driving speed) of the fan 10 is switched from the low speed to the high speed during the unit time (time t15), then the influence, which is exerted by the speed change on the temperature of the heating member 81, is small. Therefore, the controller 100 continuously executes the fixing of the toner image to the sheet S without causing any interruption. Specifically, the controller 100 turns ON the pickup roller 33 at a predetermined timing (for example, time t14, t16) after the time t12, and the sheet S is supplied from the supply tray 31 to the image forming unit 4 to continue the transfer and the fixing of the toner image with respect to the sheet S.

Figure 12:
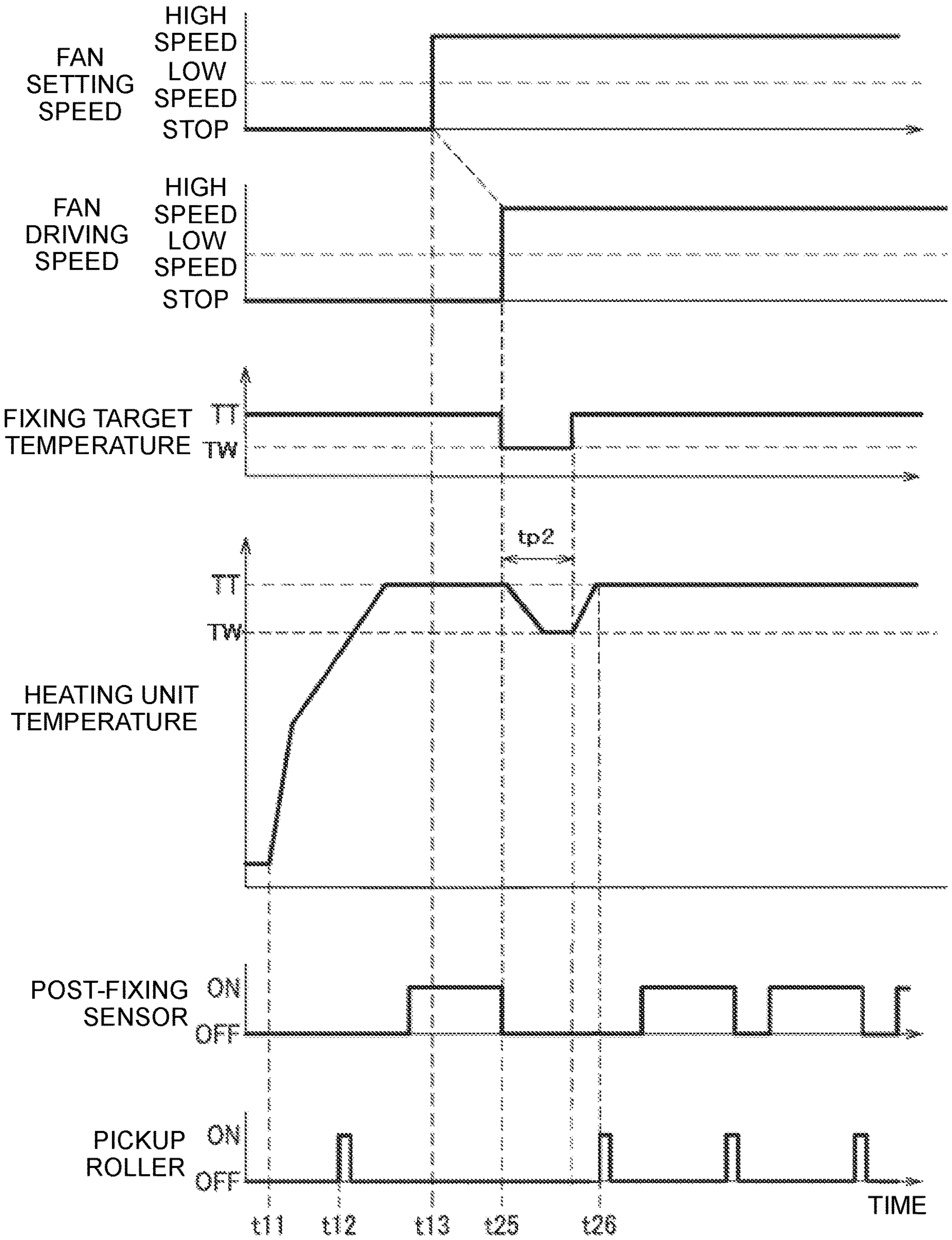
FIG. 12 is a timing chart depicting an exemplary operation of the controller.

On the other hand, when the fan setting speed of the fan 10 is switched during the printing from the stop to the high speed during the unit time, then the controller 100 executes the waiting control, and the controller 100 interrupts the fixing of the toner image to the sheet S. Specifically, for example, as depicted in FIG. 12, when the fan setting speed is switched from the stop to the high speed at the time t13, the controller 100 stops the driving of the pickup roller 33. Accordingly, the supply of the sheet S from the supply tray 31 to the image forming unit 4 is stopped (interrupted).

After that, the controller 100 switches the fan driving speed (actual driving speed of the fan 10) to the high speed, and switches the target temperature of the heating member 81 from the target temperature TT to the target temperature TW which is lower than the target temperature TT, at the point in time (time t25) at which the output of the post-fixing sensor 23 is switched from the signal that indicates that the sheet S subjected to the fixing is detected (ON state) to the signal that indicates that the sheet S is not detected (OFF state).

The controller 100 switches the target temperature of the heating member 81 from the target temperature TW to the target temperature TT at the point in time at which the predetermined time tp2 elapses after the point in time at which the target temperature of the heating member 81 is switched from the target temperature TT to the target temperature TW. After that, the controller 100 turns ON the pickup roller 33 at the point in time (t26) at which the temperature of the heating member 81 returns to the target temperature TT. Thus, the sheet S is supplied from the supply tray 31 to the image forming unit 4 to restart the transfer and the fixing of the toner image with respect to the sheet S.

The effect, which is the same as that obtained by the image forming apparatus 1 of the first embodiment, can be also obtained by the image forming apparatus 1 of the second embodiment.

Further, in the image forming apparatus 1 of the second embodiment, when the driving speed of the fan 10 is changed, then the fan setting speed is firstly changed, and then the fan driving speed is changed after terminating (finishing) the fixing of the toner image to the sheet S. That is, the actual rotation speed of the fan 10 is not changed during the fixing of the toner image to the sheet S. Therefore, it is possible to suppress the temperature change of the heating member 81 during the fixing of the toner image. Consequently, it is possible to suppress the deterioration of the image quality on the sheet S.

Further, in the image forming apparatus 1 of the second embodiment, the target temperature of the heating member 81 is lowered from the target temperature TT to the target temperature TW at the point in time at which the fixing of the toner image to the sheet S is terminated (finished), i.e., at the point in time at which the sheet S subjected to the fixing of the toner image is sent out from the fixing unit 8. A period of time, in which the sheet S is absent in the fixing unit 8, appears after sending out the sheet S from the fixing unit 8 in the state in which the supply of the sheet S to the fixing unit 8 is stopped. In this period of time, the heat of the heating member 81 is not applied to the sheet S (which is usually at about room temperature and which has a temperature lower than that of the heating member 81). Therefore, the heating member 81 is excessively heated in some cases. Further, in the second embodiment, the fan driving speed is changed at the point in time at which the sheet S is sent out from the fixing unit 8, and hence the temperature of the heating member 81 easily becomes unstable in this period of time. Therefore, the target temperature of the heating member 81 is once lowered at the point in time at which the sheet S is sent out from the fixing unit 8, and thus it is possible to suppress the heating member 81 from being excessively heated.

Note that when the first temperature sensor 85 is the temperature sensor of the non-contact type, then the flow of the air changes between the first temperature sensor 85 and the heating member 81 upon the change of the driving speed of the fan 10, and the measured value of the first temperature sensor 85 may be affected thereby. Therefore, the target temperature of the heating member 81 is once lowered at the point in time at which the driving speed of the fan 10 is changed, i.e., the target temperature is set to be relatively low in the period in which the reliability of the measured value of the first temperature sensor is lowered. Thus, it is possible to more reliably suppress the heating member 81 from being excessively heated.

The embodiments have been explained above. However, the image forming apparatus can be carried out while being appropriately modified as exemplified below by way of example.

In the embodiment described above, the fan 10 can change the driving speed at the three stages of the stop, the low speed, and the high speed. However, the fan 10 can change the driving speed at four or more stages. For example, the fan 10 can change the driving speed to the first speed, the second speed which is faster than the first speed, the third speed which is faster than the second speed, and the fourth speed which is faster than the third speed. In this case, for example, the controller 100 can be configured as follows. That is, it is determined that the speed change amount is not less than the predetermined amount, and the waiting control is executed if the driving speed of the fan 10 is changed between the first speed and the third speed during the unit time, if the driving speed of the fan 10 is changed between the first speed and the fourth speed during the unit time, and if the driving speed of the fan 10 is changed between the second speed and the fourth speed during the unit time. In other cases, it is determined that the speed change amount is less than the predetermined amount, and the fixing of the toner image to the sheet S is continued.

In this case, the controller 100 may be operated as follows. That is, the length of the predetermined times tp, tp2, each of which is provided when the driving speed of the fan 10 is changed between the first speed and the fourth speed during the unit time, is longer than the length of the predetermined times tp, tp2 each of which is provided when the driving speed of the fan 10 is changed between the first speed and the third speed during the unit time. That is, the controller 100 may be operated such that the time period until the supply of the sheet S is restarted after the completion of the fixing of the toner to the sheet S, is changed depending on the amount of change of the driving speed of the fan 10.

Further, as for the fan, it is also allowable that the driving speed can be changed at two stages of the stop and the driving. Further, in the embodiment described above, the first speed is zero. However, it is also allowable that the first speed is not zero.

In the embodiments described above, the driving speed of the fan 10 can be changed in the stepwise manner to the stop, the low speed, and the high speed. However, for example, it is also allowable that the driving speed of the fan can be changed continuously or in a non-step manner. Also in this case, the controller can be configured as follows if the driving speed of the fan is changed when the toner image is fixed to the sheet. That is, if the change amount per unit time of the driving speed of the fan (for example, the inclination of the change of the voltage applied to the fan or the like) is not less than the predetermined amount, the controller executes the waiting control. If the change amount is less than the predetermined amount, the controller continues the fixing of the toner image to the sheet without executing the waiting control.

In the embodiments described above, the waiting control is executed if the change amount per unit time of the driving speed of the fan 10 is not less than the predetermined amount when the driving speed of the fan 10 is changed when the toner image is fixed to the sheet S. However, for example, it is also allowable to adopt the following configuration. That is, the waiting control is executed if the speed difference between those before and after the change of the driving speed of the fan is not less than a predetermined value. Further, it is also allowable to adopt the following configuration. That is, when the toner image is fixed to the sheet, if the driving speed of the fan is changed, then the waiting control is executed irrelevant to the change amount per unit time of the driving speed of the fan and the speed difference between those before and after the change.

In the embodiment described above, the starting point of the predetermined time in the waiting control is the point in time at which the sheet S subjected to the fixing is discharged from the space between the heating member 81 and the pressurizing unit 82, specifically, the point in time at which the post-fixing sensor 23 is turned OFF from ON. However, for example, the starting point of the predetermined time may be a point in time at which the supply of the next sheet to the fixing unit is interrupted.

In the first embodiment and the second embodiment, the control of the temperature of the heat member 81 may be executed independently from the waiting control. For example, the control of the temperature of the heat member 81 may be executed such that the temperature of the heating member 81 is maintained at the target temperature TT, irrelative of if the waiting control is executed or not.

The predetermined time tp in the first embodiment, and the sum of the predetermined time tp2 and the period of time required for the heating member 81 to return to the target temperature TT in the second embodiment, are each an example of the "waiting time" of an invention. The "waiting time", is not limited to such a mode that the ending is determined by the time measurement by using the beginning as the starting point. The "waiting time" also includes, for example, such a mode that the ending is determined by any other condition, for example, arrival of the heating member 81 at a predetermined temperature.

In the first embodiment, the target temperature of the heating member 81 may be switched from the target temperature TT to the target temperature TW which is lower than the target temperature TT, in the same manner as in the second embodiment. Specifically, for example, the controller 100 may be operated such that the target temperature of the heating member 81 is set to be the target temperature TW during a predetermined time from the point in time at which the output of the post-fixing sensor 23 is switched from the signal that indicates the state (ON state) in which the sheet S subjected to the fixing is detected to the signal that indicates the state (OFF state) in which the sheet S is not detected.

In the embodiments described above, the fan 10 is the fan for the discharge which is provided at the exhaust port of the casing 2 for discharging the air from the inside of the casing 2. However, for example, the fan may be a fan for the intake which is provided at the intake port of the casing for introducing the external air into the casing. Further, the image forming apparatus may be provided with both of the fan for discharge and the fan for intake.

In the embodiment described above, when the toner image is fixed to the sheet S, the driving speed of the fan 10 is changed on the basis of the detection result of the internal temperature sensor 25. However, for example, the driving speed of the fan 10 may be changed on the basis of the detection result of the temperature sensor such as the second temperature sensor 86 or the like for detecting the temperature of the heating member 81. Further, the change of the driving speed of the fan is not limited to only the change based on the detection result of the temperature sensor. For example, the driving speed of the fan may be changed on the basis of at least one of the detection result of the temperature sensor, the number of sheets subjected to the printing, the size of the sheet, the thickness of the sheet, the basis weight of the sheet and the like. Further, in the embodiment described above, the thermistor is exemplified as the temperature sensor. However, it is also allowable to use any sensor provided that the sensor can detect the temperature.

In the embodiment described above, the heating member 81 is the heating roller. However, for example, the heating member may be an endless type heating belt or the like. Further, in the embodiment described above, the pressurizing unit 82 is configured to include, for example, the pressurizing belt, the pressurizing pad, and the belt guide. However, for example, the pressurizing unit may be, for example, a pressurizing roller. Further, in the embodiment described above, the heaters 83, 84 are halogen heaters which utilize the radiant heat. However, for example, the heater may be a ceramic heater or a carbon heater which utilizes the heat generation of a resistor, an IH heater which performs the induction heating for the heating member or the like. Further, the heater may be arranged on the outer side of the heating member, without being arranged on the inner side of the heating member.

In the embodiments described above, the color printer is exemplified as the image forming apparatus. However, for example, the image forming apparatus may be a monochrome or black-and-white printer. Further, the image forming apparatus may be, for example, a copying machine, a multifunctional peripheral or the like without being limited to the printer.

The present disclosure may be carried out while arbitrarily combining the respective elements explained in the embodiments and the modified embodiments described above.

In the embodiments described above, the image forming apparatus may include a fuser which has a heating member configured to heat a sheet and which is configured to fix a toner image to the sheet; a fan which is provided to cool the fuser and which is capable of changing a driving speed of the fan; and a controller. It is also allowable that if the driving speed of the fan is changed in a case that the toner image is fixed to the sheet, then the controller is capable of executing waiting control such that fixing of the toner image to the sheet is interrupted, a temperature of the heating member is controlled to be a predetermined target temperature during a period of a predetermined time after interrupting the fixing of the toner image, and the fixing of the toner image to the sheet is restarted after elapse of the predetermined time.

According to the configuration as described above, the waiting control is executed if the driving speed of the fan is changed in a case that the toner image is fixed to the sheet. Thus, it is possible to reduce the influence exerted on the fixing quality by the change of the driving speed of the fan.

Further, the controller may be configured such that, if the driving speed of the fan is changed in a case that the toner image is fixed to the sheet, the waiting control is executed in a case that a change amount per unit time of the driving speed of the fan is not less than a predetermined amount; or the fixing of the toner image to the sheet is continued without executing the waiting control in a case that the change amount is less than the predetermined amount.

According to this configuration, the waiting control can be executed if the change amount of the driving speed of the fan is large and the influence on the fixing quality is easily exerted by the change of the driving speed of the fan. It is possible to effectively reduce the influence on the fixing quality exerted by the change of the driving speed of the fan. On the other hand, if the change amount of the driving speed of the fan is small and the influence on the fixing quality is hardly exerted by the change of the driving speed of the fan, then it is possible to continue the fixing of the toner image to the sheet without interrupting the fixing.

Further, it is possible to provide such configuration that the driving speed of the fan can be changed at least to a first speed, a second speed which is faster than the first speed, and a third speed which is faster than the second speed; and the controller determines that the change amount is not less than the predetermined amount if the driving speed of the fan is changed between the first speed and the third speed during a period of the unit time.

According to this configuration, it is possible to easily determine such a case that the change amount of the driving speed of the fan is large.

Further, it is possible to provide such configuration that the driving speed of the fan can be changed at least to a first speed, a second speed which is faster than the first speed, and a third speed which is faster than the second speed; and the controller determines that the change amount is less than the predetermined amount in at least one of a case in which the driving speed of the fan is changed between the first speed and the second speed during a period of the unit time and a case in which the driving speed of the fan is changed between the second speed and the third speed during the period of the unit time.

According to this configuration, it is possible to easily determine such a case that the change amount of the driving speed of the fan is small.

Further, it is possible to provide such configuration that the image forming apparatus further comprises a temperature sensor configured to detect a temperature in a casing of the image forming apparatus; wherein the controller is configured to change the driving speed of the fan based on a detection result of the temperature sensor in a case that the toner image is fixed to the sheet.

Further, it is possible to provide such configuration that the controller increases the driving speed of the fan if the temperature, which is based on the detection result of the temperature sensor, is not less than a predetermined temperature in a case that the toner image is fixed to the sheet.

According to this configuration, it is possible to suppress any excessively high temperature in the casing in a case that the toner image is fixed to the sheet.

Further, it is possible to provide such configuration that the controller is configured to interrupt the fixing of the toner image to the sheet in the waiting control by interrupting supply of the sheet next to the sheet subjected to the fixing to the fuser and completing the fixing of the toner image to the sheet subjected to the fixing.

According to this configuration, it is possible to complete the fixing of the toner image for the sheet subjected to the fixing.

Further, it is possible to provide such configuration that the controller is configured to restart the fixing of the toner image to the sheet in the waiting control by restarting the supply of the next sheet to the fuser.

Further, it is possible to provide such configuration that the heating member is a heating roller which is heated by a heater.

What is claimed is:

1. An image forming apparatus for printing an image on a sheet, the image forming apparatus comprising:

a casing;

an image forming unit which is provided in the casing and which is configured to form a toner image on the sheet;

a sheet supply unit configured to supply the sheet to the image forming unit;

a fuser which is provided in the casing, which has a heating member configured to heat the sheet and a heater configured to heat the heating member, and which is configured to fix the toner image to the sheet;

an internal temperature sensor configured to detect a temperature at a position in the casing and outside the fuser;

a fan which is provided to ventilate an interior of the casing; and a controller, wherein the controller is configured to execute:

changing of a driving speed of the fan based on a detection result of the internal temperature sensor; and a waiting control including:

(1) interrupting supply, to the image forming unit, of a next sheet on which an image is to be printed next to a previous sheet which is supplied before the changing of the driving speed of the fan;

(2) completing the fixing of the toner image to the previous sheet;

(3) controlling a temperature of the heating member so that the temperature of the heating member becomes a target temperature; and (4) restarting supply of the next sheet to the image forming unit after a waiting time has elapsed since the completion of the fixing of the toner image to the previous sheet.

2. The image forming apparatus according to claim 1, wherein:

in a case that the driving speed of the fan is changed, the controller is configured to:

execute the waiting control in a case that a change amount per unit time of the driving speed of the fan is not less than a predetermined amount; or continue the fixing of the toner image to the sheet without executing the waiting control in a case that the change amount per unit time of the driving speed of the fan is less than the predetermined amount.

3. The image forming apparatus according to claim 2, wherein the controller is capable of changing the driving speed of the fan at least to:

a first speed;

a second speed faster than the first speed; and a third speed faster than the second speed.

4. The image forming apparatus according to claim 3, wherein:

the controller is configured to determine that the change amount of the driving speed of the fan is less than the predetermined amount:

in a case that the driving speed of the fan is increased from the first speed to the second speed during a period of the unit time; or in a case that the driving speed of the fan is increased from the second speed to the third speed during the period of the unit time.

5. The image forming apparatus according to claim 3, wherein:

the controller is configured to determine that the change amount of the driving speed of the fan is not less than the predetermined amount, in a case that the driving speed of the fan is increased from the first speed to the third speed during a period of the unit time.

6. The image forming apparatus according to claim 1, wherein, in a case that the toner image is fixed to the sheet, the controller is configured to increase the driving speed of the fan in a case that the temperature, which is based on the detection result of the internal temperature sensor, is not less than a predetermined temperature.

7. The image forming apparatus according to claim 1, wherein the heating member comprises a heating roller.

8. The image forming apparatus according to claim 1, further comprising a non-contact type temperature sensor configured to measure the temperature of the heating member in a non-contact manner.

9. The image forming apparatus according to claim 1, wherein the controller is configured to set a fan setting speed being the driving speed of the fan after the changing of the driving speed of the fan during the fixing of the toner image to the sheet, and then change the driving speed of the fan to the set fan setting speed after the completion of the fixing of the toner image to the sheet.

10. The image forming apparatus according to claim 1, wherein the controller is further configured to control the temperature of the heating member so that the temperature of the heating member becomes a waiting temperature after the completion of the fixing of the toner image to the sheet, and then control the temperature of the heating member so that the temperature of the heating member becomes the target temperature, the waiting temperature being lower than the target temperature.

11. The image forming apparatus according to claim 1, wherein the controller determines a length of the waiting time based on a change amount of the driving speed of the fan.

12. An image forming method for printing an image on a sheet by using an image forming apparatus, the image forming apparatus including:

a casing;

an image forming unit which is provided in the casing and which is configured to form a toner image on the sheet;

a sheet supply unit configured to supply the sheet to the image forming unit;

a fuser which is provided in the casing, which has a heating member configured to heat the sheet and a heater configured to heat the heating member, and which is configured to fix the toner image to the sheet;

an internal temperature sensor configured to detect a temperature at a position in the casing and outside the fuser; and a fan which is provided to ventilate an interior of the casing, the image forming method comprising:

changing a driving speed of the fan based on a detection result of the internal temperature sensor; and executing a waiting control including:

(1) interrupting supply, to the image forming unit, of a next sheet on which an image is to be printed next to a previous sheet which is supplied before the changing of the driving speed of the fan;

(2) completing the fixing of the toner image to the previous sheet;

(3) controlling a temperature of the heating member so that the temperature of the heating member becomes a target temperature; and (4) restarting supply of the next sheet to the image forming unit after a waiting time has elapsed since the completion of the fixing of the toner image to the previous sheet.

13. The image forming method according to claim 12, wherein in a case that the driving speed of the fan is changed:

execute the waiting control in a case that a change amount per unit time of the driving speed of the fan is not less than a predetermined amount; or continue the fixing of the toner image to the sheet without executing the waiting control in a case that the change amount per unit time of the driving speed of the fan is less than the predetermined amount.

14. An image forming apparatus for printing an image on a sheet, the image forming apparatus comprising:

a casing;

an image forming unit which is provided in the casing and which is configured to form a toner image on the sheet;

a sheet supply unit configured to supply the sheet to the image forming unit;

a fuser which is provided in the casing, which has a heating member configured to heat the sheet and a heater configured to heat the heating member, and which is configured to fix the toner image to the sheet;

an internal temperature sensor configured to detect a temperature at a position in the casing and outside the fuser; and a fan which is provided to ventilate an interior of the casing; and a controller, wherein in a case that a detection result of the internal temperature sensor becomes not less than a predetermined temperature, the controller is configured to execute:

changing of a driving speed of the fan;

interrupting supply, to the image forming unit, of a next sheet on which an image is to be printed next to a previous sheet which is supplied before the detection result of the internal temperature sensor becomes not less than the predetermined temperature;

completing the fixing of the toner image to the previous sheet;

controlling a temperature of the heating member so that the temperature of the heating member becomes a target temperature; and restarting supply of the next sheet to the image forming unit after the changing of the driving speed of the fan and after a waiting time has elapsed since the completion of the fixing of the toner image to the previous sheet.

15. The image forming apparatus according to claim 14, wherein the controller executes the changing of the driving speed of the fan after the completion of the fixing of the toner image to the previous sheet.

* * * * *